(12) United States Patent
Heczko

(10) Patent No.: US 10,327,288 B2
(45) Date of Patent: Jun. 18, 2019

(54) BEVERAGE PACKAGE WITH INDUCTION HEATER

(71) Applicant: James Heczko, Oceanside, CA (US)

(72) Inventor: James Heczko, Oceanside, CA (US)

( * ) Notice: Subject to any disclaimer, the term of this patent is extended or adjusted under 35 U.S.C. 154(b) by 0 days.

(21) Appl. No.: 15/968,639

(22) Filed: May 1, 2018

(65) Prior Publication Data

US 2018/0249536 A1    Aug. 30, 2018

Related U.S. Application Data

(63) Continuation of application No. 14/630,276, filed on Feb. 24, 2015, now Pat. No. 9,967,924.

(Continued)

(51) Int. Cl.
*H05B 6/12* (2006.01)
*H05B 6/06* (2006.01)
*A47J 36/24* (2006.01)

(52) U.S. Cl.
CPC ........ *H05B 6/1245* (2013.01); *A47J 36/2483* (2013.01); *H05B 6/06* (2013.01); *Y02B 40/126* (2013.01)

(58) Field of Classification Search
CPC ....... A47J 36/2483; H05B 6/06; Y02B 40/126
See application file for complete search history.

(56) References Cited

U.S. PATENT DOCUMENTS 2,236,238 A * 3/1941 Lacy ................. A47J 36/2461
                                                                    219/436
3,742,178 A    6/1973 Harnden, Jr.
(Continued)

FOREIGN PATENT DOCUMENTS

CN    101795610 A    8/2010
EP    1708545         10/2006
(Continued)

OTHER PUBLICATIONS

The Self-Cooling Technology and the Future—Part 3—Best in Packaging; http://bestinpackaging.com/2012/12/17/the-self-cooling-technology-and-the-future-part-3/ ; printed Feb. 20, 2015.

(Continued)

*Primary Examiner* — Sean M Michalski
(74) *Attorney, Agent, or Firm* — Stetina Brunda Garred and Brucker

(57) ABSTRACT

A system for heating a consumable product includes a package and a heating apparatus. The package includes a container body including a cavity at least partially bounded by a side wall and one or more inductively heatable elements disposed within the cavity. The side wall includes a non-inductively heatable portion. The cavity is configured to contain the consumable product. The heating apparatus includes: a housing, which defines a package-receiving cavity configured to position the package in an operative position; one or more induction coils disposed within the housing, a controller; and one or more temperature sensing devices disposed in proximity to the non-inductively heatable portion of the side wall when the package is in the operative position. The controller is configured to control one or more operating parameters of the heating apparatus based at least partially on one or more signals received from the one or more temperature sensing devices.

20 Claims, 24 Drawing Sheets

Related U.S. Application Data

(60) Provisional application No. 61/944,070, filed on Feb. 25, 2014, provisional application No. 62/016,101, filed on Jun. 24, 2014.

(56) References Cited

U.S. PATENT DOCUMENTS

| | | | |
|---|---|---|---|
| 4,110,587 A | | 8/1978 | Souder, Jr. et al. |
| 4,110,588 A | | 8/1978 | Holz |
| 4,151,387 A | | 4/1979 | Peters, Jr. |
| 4,219,715 A | * | 8/1980 | Mandle ............... H02K 13/00 219/736 |
| 4,442,343 A | * | 4/1984 | Genuit ............... H05B 1/0269 219/386 |
| 4,801,782 A | * | 1/1989 | Ineson ............... A47J 36/2466 219/438 |
| 4,804,097 A | | 2/1989 | Alberghini et al. |
| 4,983,798 A | | 1/1991 | Eckler et al. |
| 5,141,121 A | | 8/1992 | Brown et al. |
| 5,379,916 A | * | 1/1995 | Martindale ......... B67D 1/1234 222/1 |
| 5,466,915 A | | 11/1995 | Meier et al. |
| 5,690,851 A | | 11/1997 | Yoshioka et al. |
| 5,928,542 A | * | 7/1999 | Miguelino ........ A47G 19/2288 136/291 |
| 5,954,984 A | | 9/1999 | Ablah et al. |
| 6,082,114 A | | 7/2000 | Leonoff |
| 6,634,417 B1 | * | 10/2003 | Kolowich ........... A47G 19/127 165/10 |
| 7,432,478 B2 | | 10/2008 | Segiet et al. |
| 7,432,479 B2 | | 10/2008 | Avendano et al. |
| 7,435,930 B2 | | 10/2008 | Segiet et al. |
| 7,475,787 B2 | | 1/2009 | Gruver et al. |
| 7,497,352 B2 | | 3/2009 | Segiet et al. |
| 7,829,827 B2 | | 11/2010 | Rosenbloom et al. |
| RE42,362 E | | 5/2011 | Schuler |
| 8,389,913 B2 | | 3/2013 | Wilson et al. |
| 8,481,893 B2 | | 7/2013 | Rosenbloom et al. |
| 8,534,345 B1 | | 9/2013 | French et al. |
| 8,564,778 B1 | * | 10/2013 | Igarashi ............... A45D 44/005 356/402 |
| 8,618,448 B2 | | 12/2013 | Alexander |
| 9,035,222 B2 | * | 5/2015 | Alexander ........... A47G 19/027 165/58 |
| 9,181,015 B2 | * | 11/2015 | Booska .............. B65D 81/3484 |
| 9,547,784 B1 | * | 1/2017 | Montag .............. G06K 7/10722 |
| 9,782,036 B2 | * | 10/2017 | Alexander .......... A47J 36/2433 |
| 9,801,482 B1 | * | 10/2017 | Alexander .......... A47J 41/0044 |
| 9,814,331 B2 | * | 11/2017 | Alexander .......... A47G 19/027 |
| 9,997,039 B1 | * | 6/2018 | Heaton .............. G08B 21/0423 |
| 2002/0097396 A1 | * | 7/2002 | Schafer .................. B07C 5/10 356/240.1 |
| 2003/0188512 A1 | * | 10/2003 | Jorba Ribes ............ B65B 3/006 53/411 |
| 2004/0129924 A1 | | 7/2004 | Stark |
| 2007/0170174 A1 | | 7/2007 | Segiet et al. |
| 2007/0170177 A1 | | 7/2007 | Avendano et al. |
| 2007/0170178 A1 | | 7/2007 | Segiet et al. |
| 2008/0029505 A1 | | 2/2008 | Rosenbloom et al. |
| 2008/0100288 A1 | * | 5/2008 | Leung ................ G01N 27/9046 324/222 |
| 2008/0302800 A1 | | 12/2008 | Chou |
| 2009/0065500 A1 | | 3/2009 | England et al. |
| 2009/0292615 A1 | * | 11/2009 | Natunen .............. G06Q 20/202 705/21 |
| 2010/0000980 A1 | * | 1/2010 | Popescu ................ A47J 36/20 219/201 |
| 2010/0121689 A1 | * | 5/2010 | Wallace ............... G06Q 10/087 705/14.1 |
| 2010/0017089 A1 | | 7/2010 | Wilson et al. |
| 2011/0011850 A1 | * | 1/2011 | Rosenbloom ....... A47J 36/2483 219/622 |
| 2011/0072978 A1 | | 3/2011 | Popescu |
| 2011/0183747 A1 | * | 7/2011 | Cole ..................... G07F 17/32 463/25 |
| 2012/0069131 A1 | * | 3/2012 | Abelow ............... G06Q 10/067 348/14.01 |
| 2012/0205363 A1 | | 8/2012 | Takatomi et al. |
| 2012/0312521 A1 | | 12/2012 | Zebuhr et al. |
| 2013/0008428 A1 | | 1/2013 | Leavitt et al. |
| 2013/0038633 A1 | * | 2/2013 | Maggiore ............. B01D 65/104 345/633 |
| 2013/0200064 A1 | | 8/2013 | Alexander |
| 2013/0344204 A1 | | 12/2013 | Goodson |
| 2014/0158769 A1 | * | 6/2014 | Powell ............... G06K 7/10811 235/462.06 |
| 2017/0076500 A1 | * | 3/2017 | Maggiore ............ G06T 19/006 |
| 2018/0114415 A1 | * | 4/2018 | Mattingly ................ G08B 7/02 |

FOREIGN PATENT DOCUMENTS

| | | |
|---|---|---|
| EP | 1912481 | 4/2008 |
| WO | 2007087527 | 8/2007 |
| WO | 2012061968 | 5/2012 |
| WO | 2012153394 | 11/2012 |
| WO | 2013027067 | 2/2013 |

OTHER PUBLICATIONS

Milk Cafe BMF600XL Milk Frother / Breville / http://www.brevilleusa.com/milk-cafe.html ; printed Feb. 20, 2015.

Copenheaver, Blaine R.; PCT International Search Report and Opinion; PCT/US2015/017500; dated May 22, 2015;13 pages.

Chinese Patent Office, Nov. 2, 2018, 6 pages, China.

* cited by examiner

BEVERAGE PACKAGE WITH INDUCTION HEATER

CROSS-REFERENCE TO RELATED APPLICATIONS

This application relates to and claims the benefit of U.S. Provisional Application No. 61/944,070, filed Feb. 25, 2014 and entitled "Beverage Package with Induction Heater," and U.S. Provisional Application No. 62/016,101, filed Jun. 24, 2014 and entitled "Beverage Package with Induction Heater," the disclosures of which are incorporated herein by reference in their entireties.

STATEMENT RE: FEDERALLY SPONSORED RESEARCH/DEVELOPMENT

Not Applicable

BACKGROUND

Technical Field

The present disclosure relates generally to food and beverage packaging and radio frequency (RF)/induction heating of foodstuffs.

Discussion of Related Art

Consumers find it convenient and desirable to use prepared packaged consumable products, such as beverages. Drinks, or beverages, are liquids specifically prepared for human consumption. Prepared beverages are commonly packaged in bottles, cartons and cans.

Prepared beverages may be served cold, e.g., carbonated drinks, fruit juices, juice drinks, energy drinks, and milk. Tea and apple cider are beverages commonly served hot or iced. Some drinks are served mostly as a hot beverage, e.g., coffee, hot egg drinks, espresso, hot ginger, herbal tea, hot chocolate, hot toddy, and Irish coffee.

Hot beverages may be prepared by the consumer (e.g., making coffee in a coffee-maker) or prepared for the consumer by someone else and served to the consumer immediately prior to consumption (e.g., buying a cup of coffee at a shop). There are relatively few prepared packaged hot beverages available to consumers. One reason for the shortage of packaged hot beverages is a lack of convenient and economical ways to prepackage and heat prepared beverages to provide hot beverages.

Consumable products, e.g., packaged beverages, are commonly provided in convenient packaging to meet consumers' needs. There is a need for continued innovation in the packaging of foods and beverages to make heated consumable products, e.g., hot beverages, more accessible for consumers in convenient packaging.

BRIEF SUMMARY

In an aspect of the present disclosure a system for heating a consumable product is provided. The system includes a package and a heating apparatus. The package includes a container body including a cavity at least partially bounded by a side wall and one or more inductively heatable elements disposed within the cavity. The side wall includes a non-inductively heatable portion. The cavity is configured to contain the consumable product. The heating apparatus includes a housing and one or more induction coils disposed within the housing. The housing defines a package-receiving cavity configured to position the package in an operative position. The heating apparatus includes a controller and one or more temperature sensing devices disposed in proximity to the non-inductively heatable portion of the side wall when the package is in the operative position. The controller is communicatively coupled to the one or more temperature sensing devices and configured to control one or more operating parameters of the heating apparatus based at least partially on one or more signals received from the one or more temperature sensing devices.

In another aspect of the present disclosure, a beverage packaging and heating system is provided and includes a package configured to contain a beverage. The package includes a first portion and a second portion disposed below the first portion. The first portion is made of a non-inductively heatable material. The second portion is made of an inductively heatable material. The beverage packaging and heating system also includes a heating apparatus. The heating apparatus includes a housing defining a cavity configured to receive the second portion of the package therein. The heating apparatus includes one or more induction coils disposed within the housing, a controller, and one or more temperature sensing devices. The one or more temperature sensing devices are disposed in proximity to a side wall of the first portion of the package. The controller is communicatively coupled to the one or more temperature sensing devices and configured to control at least one operating parameter of the heating apparatus based at least partially on one or more signals received from the one or more temperature sensing devices.

BRIEF DESCRIPTION OF THE DRAWINGS

Objects and features of the presently-disclosed beverage packaging and heating system will become apparent to those of ordinary skill in the art when descriptions of various embodiments thereof are read with reference to the accompanying drawings, of which.

DETAILED DESCRIPTION

Figure 1:
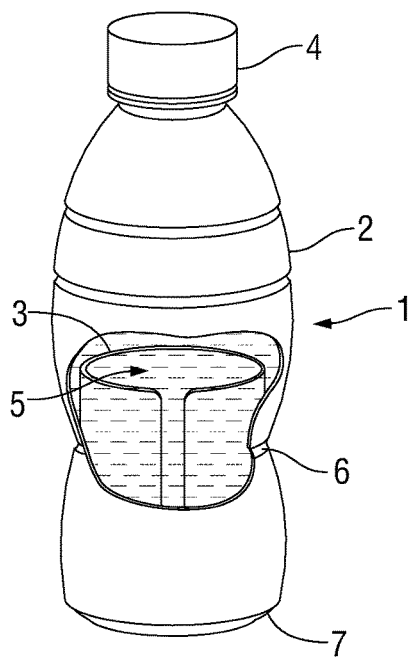
FIG. 1 is a perspective view in partial cutaway of a package in accordance with an embodiment of the present disclosure.

Hereinafter, embodiments of a beverage packaging and heating system are described with reference to the accompanying drawings. Like reference numerals may refer to similar or identical elements throughout the description of the figures. The various features of the embodiments disclosed herein can be used alone, or in varying combinations with each other and are not intended to be limited to the specific combination described herein. Thus, the scope of the claims is not to be limited by the illustrated embodiments.

This description may use the phrases "in an embodiment," "in embodiments," "in some embodiments," or "in other embodiments," which may each refer to one or more of the same or different embodiments in accordance with the present disclosure.

Electromagnetic energy is generally classified by increasing energy or decreasing wavelength into radio waves, microwaves, infrared, visible light, ultraviolet, X-rays and gamma-rays. As it is used herein, "radio frequency" or "RF" generally refers to electromagnetic waves having a lower frequency than microwaves.

As it is used in this description, "transmission line" generally refers to any transmission medium that can be used for the propagation of signals from one point to another. A transmission line may be, for example, a wire, two or more conductors separated by an insulating medium (two-wire, coaxial, microstrip, etc.), a waveguide, a fiber optic line and/or fiber optic bundles. As it is used in this description, "user interface" generally refers to any visual, graphical, tactile, audible, sensory or other mechanism for providing information to and/or receiving information from a consumer or other entity. The term "user interface" as used herein may refer to an interface between a human user and one or more devices to enable communication between the user and the device(s).

As used herein, the terms "power source" and "power supply" refer to any source of electrical power, e.g., electrical outlet, a/c generator, battery or battery pack, etc. As it is used in this description, "switch" or "switches" generally refers to any electrical actuators, mechanical actuators, electro-mechanical actuators (rotatable actuators, pivotable actuators, toggle-like actuators, buttons, etc.), optical actuators, or any suitable device that generally fulfills the purpose of connecting and disconnecting electronic devices, or component thereof, instruments, equipment, transmission line or connections, or software.

Various embodiments of the present disclosure provide a package and heating system that provides an economical and convenient way to package and heat prepared consumable products. Embodiments of the presently-disclosed package and heating system may be suitable for use with a variety of food and non-food liquids. Embodiments may be suitable for use with beverages such as soft drinks, energy drinks, milk, cocoa, soup, baby formula, nutrition drinks, and/or alcoholic beverages. The presently-disclosed package and heating apparatus embodiments may additionally, or alternatively, be used to heat viscous foodstuffs or non-liquids such as beans, prepared oatmeal and pasta in sauce. The presently-disclosed package and heating apparatus embodiments may additionally, or alternatively, be used for convenient heating of non-food liquids (e.g., scented liquids, balms and medicaments).

The presently-disclosed package and heating embodiments may additionally, or alternatively, be used for convenient heating of frozen foodstuffs. In doing so, the end temperature of the foodstuff may not be "hot" on a temperature scale. For example, a frozen beverage might be heated to produce a cold beverage at say 40 degrees F. Alternatively a frozen beverage might be partially melted and mixed to produce a slush or slurry. Thus the end temperature of the foodstuff may be similar or even identical to the starting temperature of the foodstuff, and the process of heating as defined herein may refer to the addition of thermal energy to a consumable substance rather than necessarily to an increase in its temperature.

Various embodiments of the presently-disclosed beverage packaging and heating system include a disposable beverage package and an RF/induction heating apparatus that is operably coupleable with the package to warm the contents of the package. Embodiments of the presently-disclosed package may include: a container, e.g., a plastic container, which is not susceptible to induction heating; an inductively heatable element, e.g., a metal element, which is susceptible to induction heating, disposed within the container; and a closure that seals the container. A beverage, e.g., coffee, may be hermetically sealed within the package, e.g., preserved from spoilage. In accordance with embodiments of the present disclosure, an inductively heatable element is immersed in the beverage and facilitates inductive heating of the beverage by the heating apparatus.

In some embodiments, the heating apparatus is a table-top appliance which contains one or more helically wound induction coil(s). The presently-disclosed heating apparatus may include a current generator, sensors and controls that send alternating electrical current through the coil at radio frequencies in a controlled manner.

Figure 2:
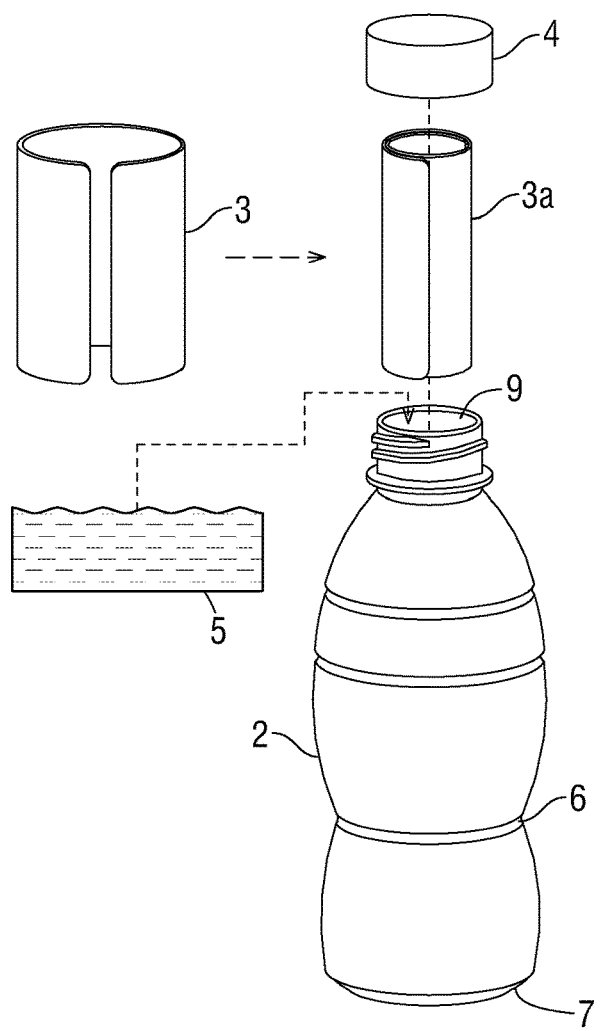
FIG. 2 is a perspective view of the package of FIG. 1, shown with parts separated, in accordance with an embodiment of the present disclosure.

FIGS. 1 and 2 show a package 1 in accordance with an embodiment of the present disclosure. Package 1 includes container 2 and inductively heatable element 3. Container 2 may be a plastic bottle for storing liquids, e.g., beverages. Inductively heatable element 3 may be made of metal that is susceptible to induction heating; and may be formed into a generally tubular shape for placement within container 2. Beverage 5, e.g., prepared coffee, may be introduced into container 2. In some embodiments, container 2 includes cap 4. Cap 4 may be any closure suitable for container 2. Cap 4 may be adapted to sealingly engage with container 2 and/or to hermetically seal package 1, e.g., to preserve beverage 5. As seen in FIG. 1, when assembled, package 1 externally appears as a standard beverage bottle and internally contains an inductively heatable element 3 that is immersed in stored beverage 5. Package 1 is configured to serve as a protective barrier to preserve beverage 5 and provide consumers with a convenient package.

Figure 3:
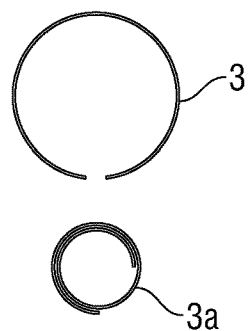
FIG. 3 is a top view of an inductively heatable element, shown in compressed and expanded configurations, in accordance with an embodiment of the present disclosure.

FIGS. 2 and 3 illustrate how package 1 may be assembled. Inductively heatable element 3 may be formed from a sheet of metal into a generally tubular shape. In an expanded configuration, inductively heatable element 3 has an outer diameter that corresponds to the inner diameter of ridge 6 of container 2. In order to place inductively heatable element 3 into container 2, inductively heatable element 3a is converted, e.g., rolled or coiled, into a compressed configuration, such that the outer diameter of inductively heatable element 3a is smaller than the inner diameter of mouth 9 of container 2.

FIG. 3 shows a top view of inductively heatable element 3 in an expanded configuration and inductively heatable element 3a in a compressed configuration. Once inductively heatable element 3 is placed within container 2, inductively heatable element 3 is restored to its expanded configuration and is lodged securely within container 2, against the inside of ridge 6 and/or foot 7. Beverage 5 is placed within container 2, and cap 4 is attached, e.g., screwed in place, to hermetically seal package 1. As part of the packaging process, the package may be subjected to standard beverage preservation techniques such as hot filling, retort, aseptic filling, etc.

Figure 4:
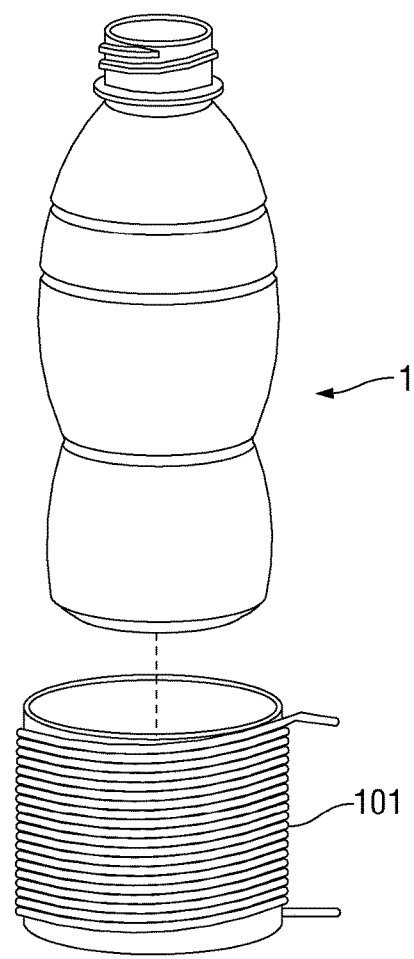
FIG. 4 is a perspective view of the package of FIG. 1 positioned above a coil in accordance with an embodiment of the present disclosure.

FIG. 4 is a perspective view of package 1 as it may be placed into coil 101 of heating apparatus 100. Coil 101 (shown in FIG. 6) may be a helically wound litz wire having a diameter that allows for placement of package 1, or portion thereof, into coil 101. When package 1 is placed into coil 101, inductively heatable element 3 is axially aligned with and surrounded by coil 101. When high-frequency alternating current is run through coil 101, eddy currents will be induced in inductively heatable element 3 that cause heating of inductively heatable element 3. Heat generation due to eddy currents and hysteresis induced by alternating current supplied through coil 101 is utilized to heat inductively heatable element 3 and, thereby, to heat beverage 5 in which inductively heatable element 3 is immersed.

Figure 5:
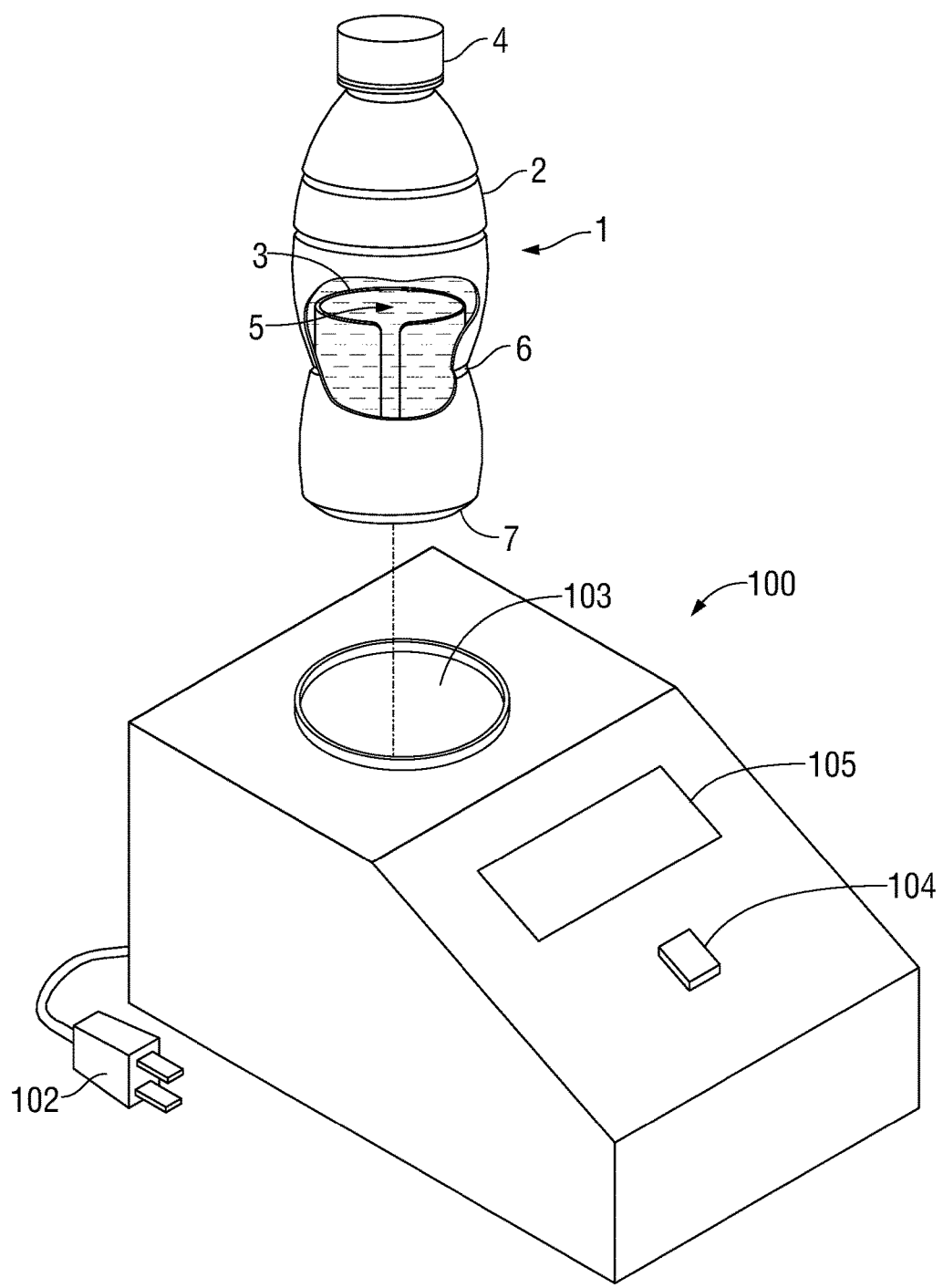
FIG. 5 is a perspective view of the package of FIG. 1 positioned above a heating apparatus in accordance with an embodiment of the present disclosure.

FIG. 5 shows package 1 positioned above heating apparatus 100. In use, heating apparatus 100 is placed on a counter, desk or other surface and plug 102 is plugged into a household electrical outlet. Package 1 is inserted into cavity 103 of heating apparatus 100, and switch 104 is pressed to initiate a heating cycle. A display 105 may present information to the consumer, such as instructions, status of the heating process, or errors in the use of device. In other embodiments, the heating apparatus 100 may be a portable, battery-operated apparatus suitable for use with the package 1.

Figure 6:
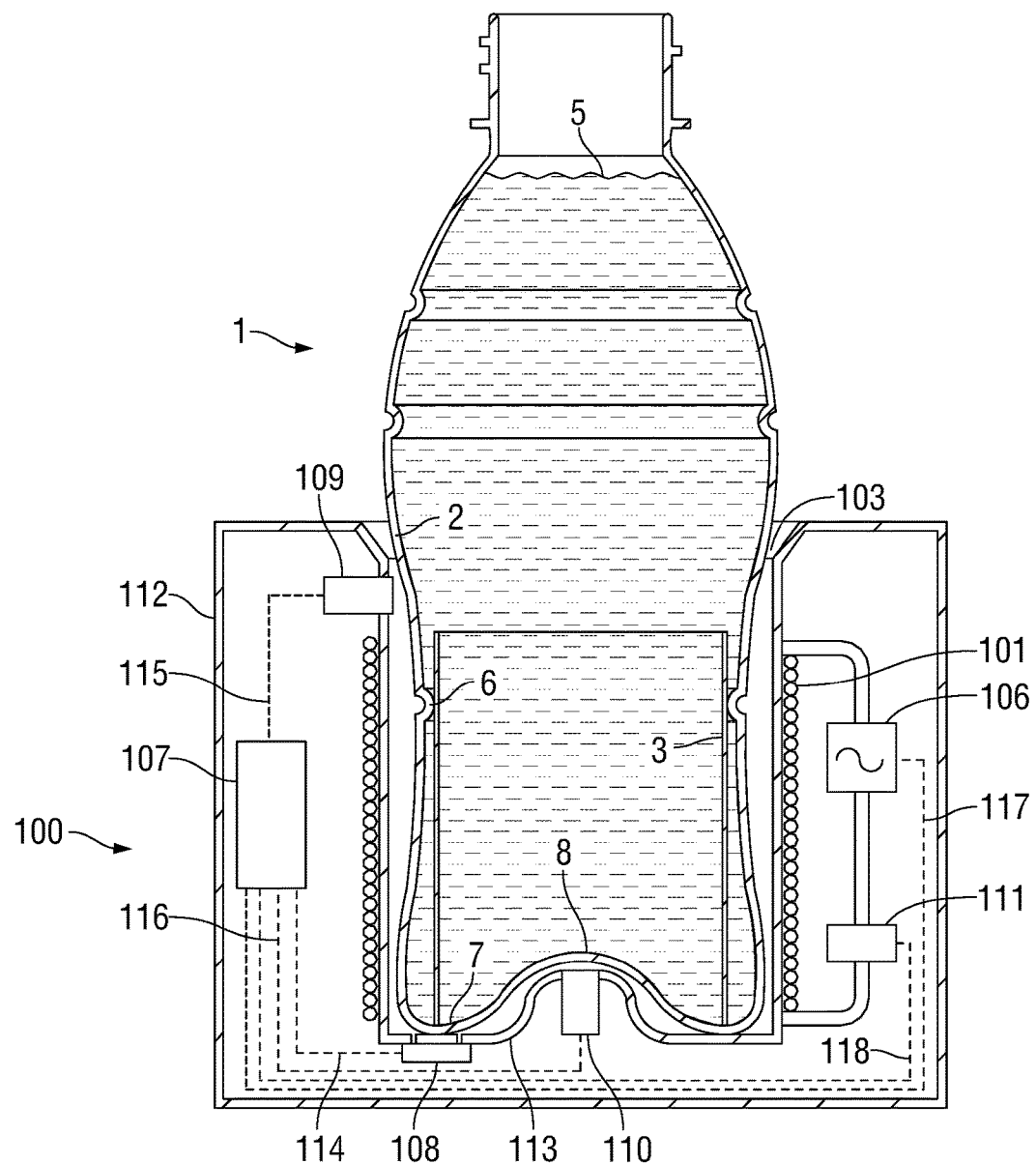
FIG. 6 is a cross-sectional view of the heating apparatus of FIG. 5 and the package of FIG. 1 in accordance with an embodiment of the present disclosure.

FIG. 6 shows heating apparatus 100 operably coupled to package 1. Heating apparatus 100 includes housing 112 and controller 107. In some embodiments, as shown for example in FIG. 6, the controller 107 is formed integrally with the heating apparatus 100. In other embodiments, the controller 107 may be provided as a separate component coupled to the heating apparatus 100. Controller 107 may include any type of computing device, computational circuit, or any type of processor or processing circuit capable of executing a series of instructions that are stored in a memory.

It is to be understood that the dashed lines indicative of electrical connections (e.g., electrical conductors) between various components of the heating apparatus 100 are merely illustrative and non-limiting examples of electrical connections, and that heating apparatus embodiments of the present disclosure may utilize many different configurations of electrical connections, some with additional, fewer, or different electrical connections than depicted in FIG. 6.

Heating apparatus 100 includes scale 108, which is communicatively coupled to controller 107 with transmission line 114. Upon insertion of package 1 into cavity 103, the weight of package 1 is registered by scale 108, which communicates with controller 107. Upper temperature probe 109 is positioned adjacent to container 2 and above inductively heatable element 3. Upper temperature probe 109 measures the temperature of the side-wall of container 2 and is communicatively coupled to controller 107 with transmission line 115. Similarly, lower temperature probe 110 measures the temperature of the bottom of container 2 and is communicatively coupled to controller 107 with transmission line 116. Lower temperature probe 107 is located within protrusion 113. Protrusion 113 is configured to engage with push-up portion 8 on the bottom of container 2. A power source 106 provides high frequency alternating current to coil 101 and is communicatively coupled to controller 107 with transmission line 117. An electrical sensor 111 detects the current flowing through coil 101 and is communicatively coupled to controller 107 with transmission line 118.

To use heating apparatus 100, a consumer removes cap 4 and inserts package 1 into cavity 103 of heating apparatus 100. The consumer then presses (or otherwise activates) switch 104 to activate heating apparatus 100. When switch 104 is activated, e.g., depressed, switch 104 communicates with controller 107. Controller 107 may be configured to control one or more operating parameters associated with the power source 106 based on one or more signals indicative of consumer input, such as generated by the activation switch 104 and/or one or more separate, consumer-actuatable buttons or switches. Examples of switch configurations that may be suitable for use with heating apparatus 100 include pushbutton, toggle, rocker, tactile, snap, rotary and slide.

As an alternative to, or in addition to, activation switch 104, heating apparatus 100 may include voice input technology, which may include hardware and/or software, which may be incorporated into heating apparatus 100, or component thereof (e.g., controller 107). The voice input technology may include voice recognition, voice activation, voice rectification, and/or embedded speech.

In some embodiments, controller 107 is configured to carry out a heating protocol in response to receiving an electrical signal from the switch 104. In accordance with the heating protocol, controller 107 processes inputs from various sensors. The inputs may include the weight registered on scale 108, the temperature indicated by upper temperature probe 109, and/or the temperature indicated by the lower temperature probe 110. Based on the received input(s), controller 107 determines whether to activate power source 106 and/or determines operating parameters of the heating apparatus 100, e.g., amount of power to be supplied through coil 101 and/or duration. If power is to be applied, then controller 107 activates power source 106, e.g., at a predetermined power level and for a predetermined period of time. In some embodiments, while power source 106 is activated, controller 107 continuously measures readings from temperature probe 109 and/or temperature probe 110, and/or readings from electrical sensor 111. Controller 107 may determine when to shut off power source 106 and may communicate to the consumer on display 105. If the heating process went as planned (e.g., sensor readings were as expected and the measured temperature is correct), then the display would indicate that it is okay for the consumer to remove package 1 and consume beverage 5. If the heating process did not go as expected, then the display would indicate the error and what the consumer should do about it (e.g., "do not remove", "inappropriate or defective bottle", "press button again", etc.)

During the heating cycle described above, the current flowing through coil 101 induces electrical current eddies and hysteresis within inductively heatable element 3, which cause inductively heatable element 3 to increase in temperature. Since inductively heatable element 3 is immersed in beverage 5, the increasing temperature of inductively heatable element 3 warms beverage 5. When current flow through coil 101 is shut-off by controller 107 (i.e., at the programmed temperature or after the proscribed time interval), the heating of inductively heatable element 3 ceases, and inductively heatable element 3 comes into temperature equilibrium with beverage 5 immediately surrounding it.

In accordance with an embodiment of the presently-disclosed heating apparatus 100, if a "foreign" container with a flat bottom (such as a can) is inserted into cavity 103, then such container would rest on protrusion 113 and would not register weight on scale 108, and heating apparatus 100 would not be activated.

During the heating cycle, the temperature of beverage 5 may vary considerably between the bottom, middle and top regions of container 2. In some embodiments, a device may be incorporated within heating apparatus 100 that agitates package 1 as part of the heating cycle. Additionally, or alternatively, the consumer may shake package 1 to distribute the temperature of beverage 5 uniformly before he or she consumes beverage 5.

Figure 38:
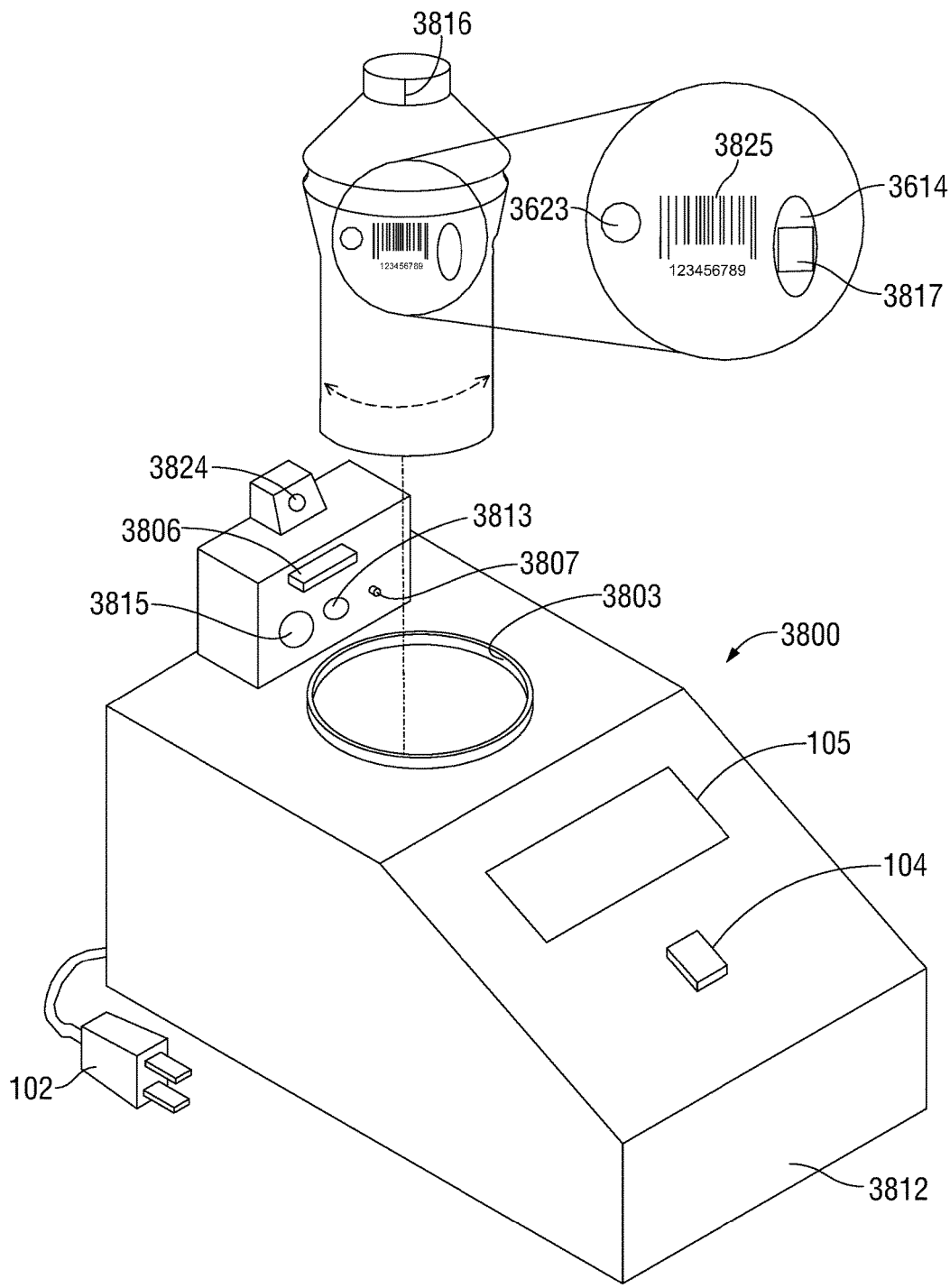
FIG. 38 is a perspective view of a heating apparatus and a package in accordance with another embodiment of the present disclosure.
Figure 39:
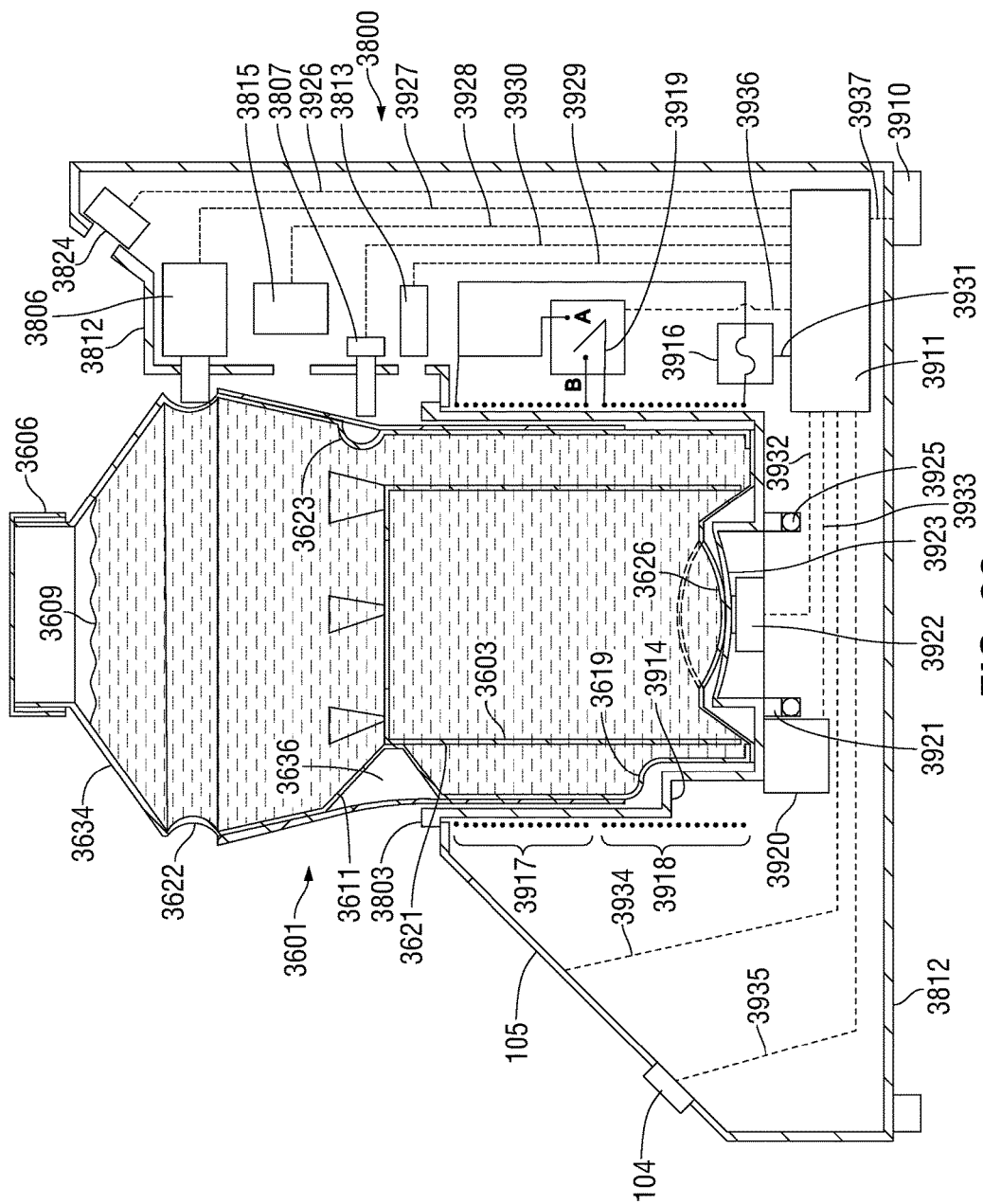
FIG. 39 is a cross-sectional view of the heating apparatus and the package of FIG. 38 in accordance with an embodiment of the present disclosure.
Figure 49:
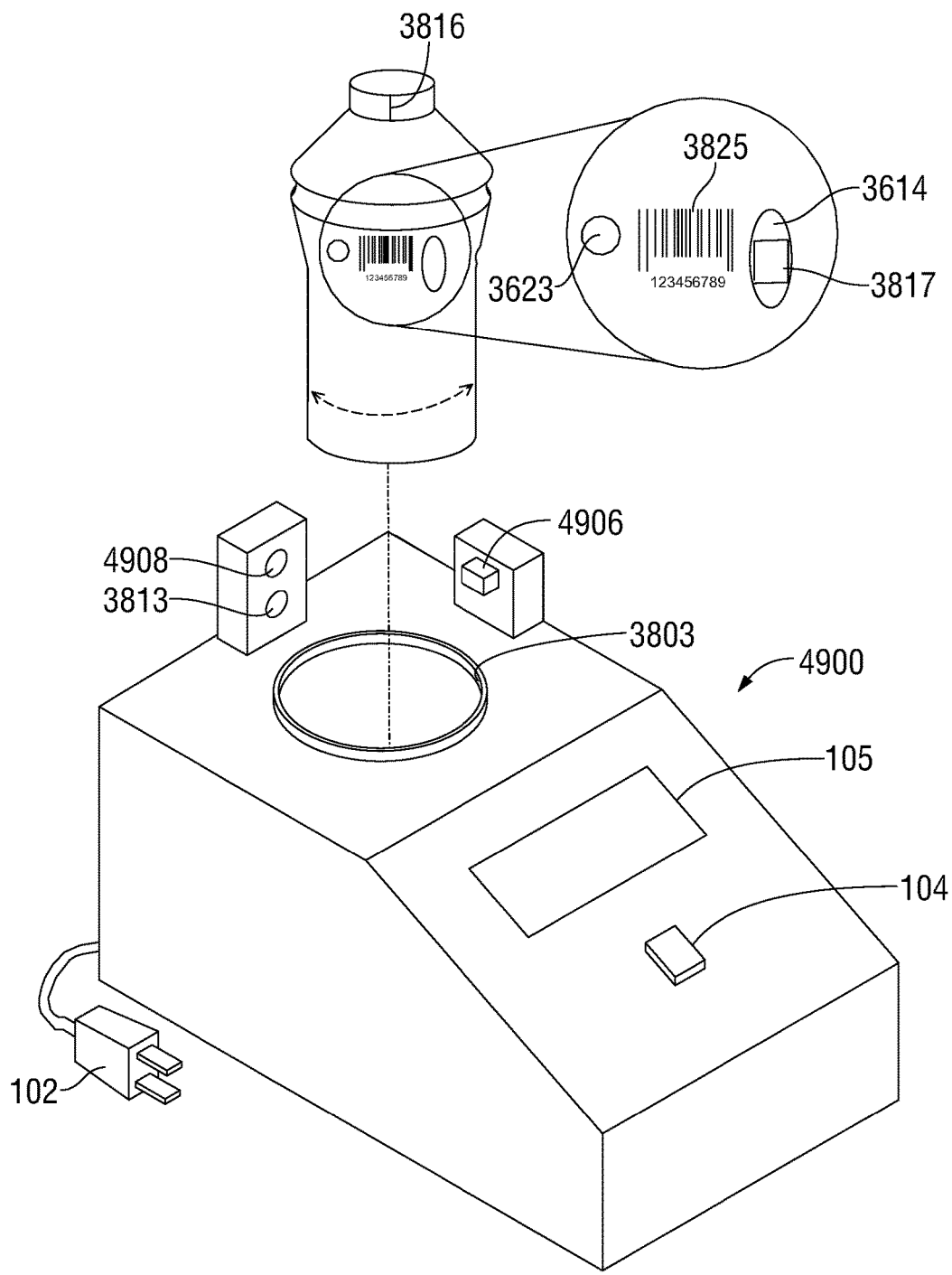
FIG. 49 is a perspective view of a heating apparatus and a package in accordance with another embodiment of the present disclosure.
Figure 50:
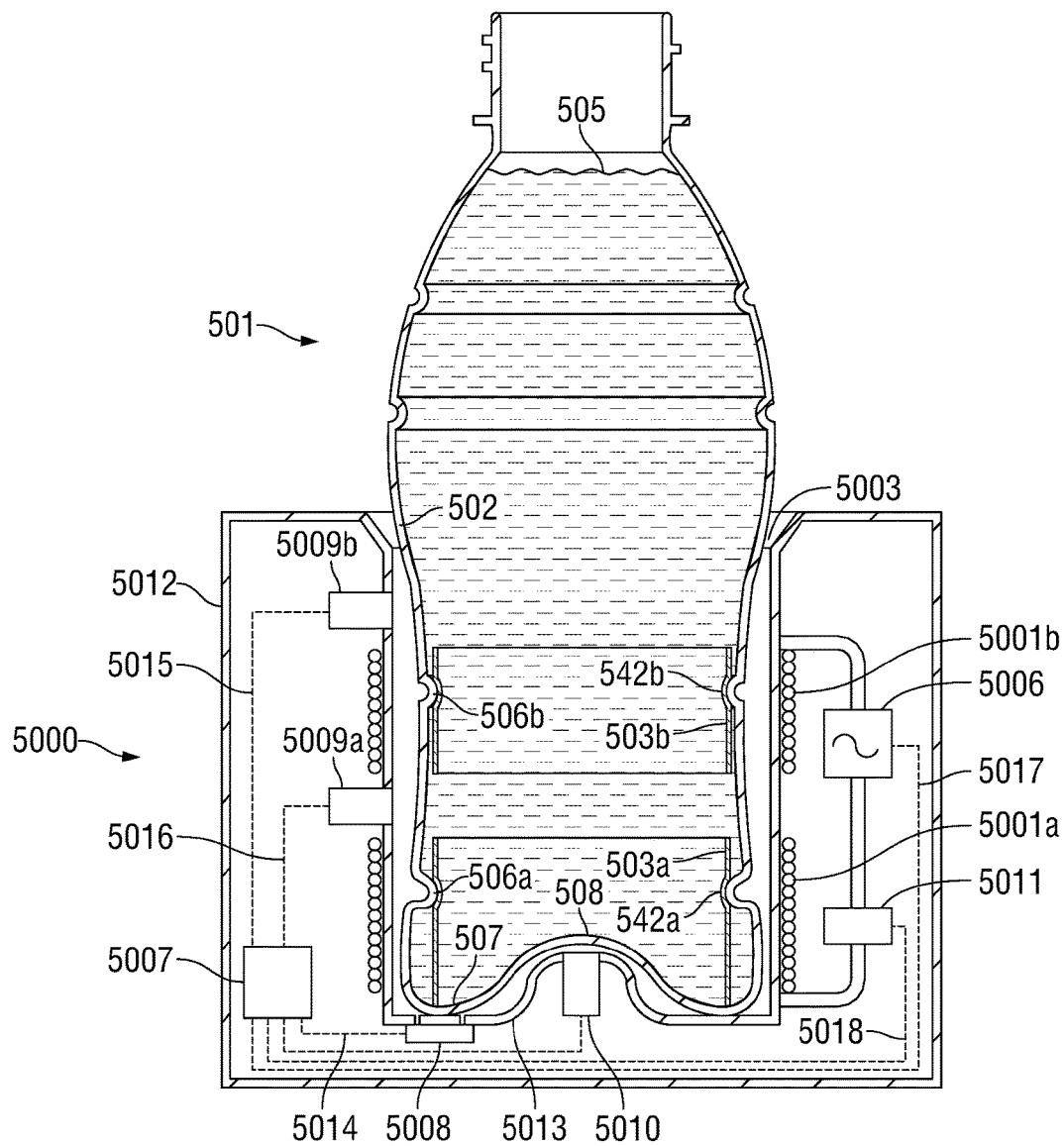
FIG. 50 is a cross-sectional view of a heating apparatus and a package in accordance with another embodiment of the present disclosure.

It is to be understood that heating apparatus 100 may include any of the components and/or electrical connections of heating apparatus 3800 shown in FIGS. 38 and 39, heating apparatus 4900 shown in FIG. 49, and/or heating apparatus 5000 shown in FIG. 50.

Figure 7:
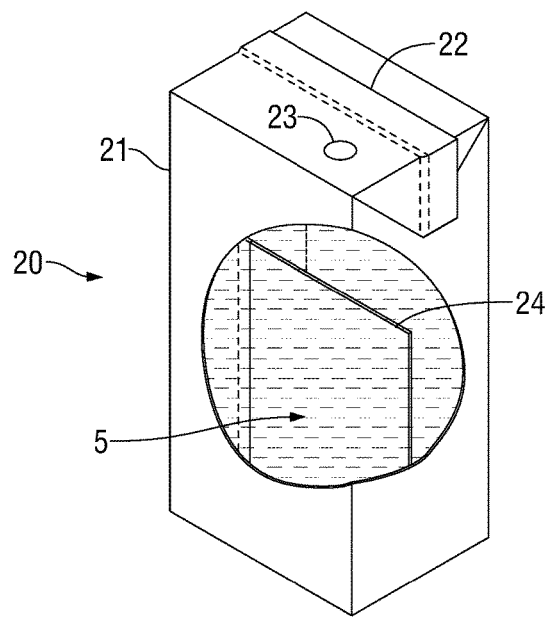
FIG. 7 is a perspective view in partial cutaway of another embodiment of a package in accordance with the present disclosure.

FIG. 7 shows an alternate embodiment of the package in accordance with the present disclosure. In the embodiment illustrated in FIG. 7, package 20 resembles a standard beverage box and contains an inductively heatable element 24. Container 21 may be made from a laminated sheet of material comprising multiple layers. For example, the container may be made with layers of paperboard, polyethylene and a barrier polymer such as EVOH, which would provide structure and barrier properties, but would also be permissive of the passage of radio-frequency energy to inductively heatable element 24. Package 20 may include an outlet 23 (e.g., a piercable foil straw hole) through which the consumer can gain access to beverage 5. Package 20 may be made on machinery comparable to that used to make standard beverage boxes. Such machinery typically forms a box-shaped container from a web of laminated material by forming bottom and side seams (not shown in FIG. 7), then adding beverage 5 and forming top seam 22. Inductively heatable element 24 may be included in the manufacturing process by incorporating it into to the web from which container 21 is formed or by placing it into container 21 at the time container 21 is filled with beverage 5.

Figure 8:
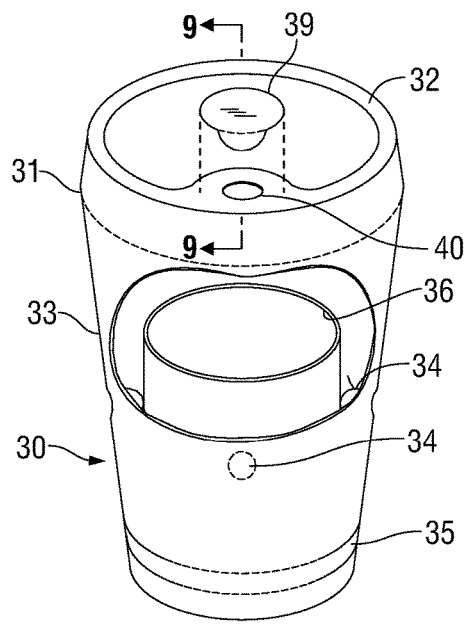
FIG. 8 is a perspective view in partial cutaway of another embodiment of a package in accordance with the present disclosure.
Figure 9:
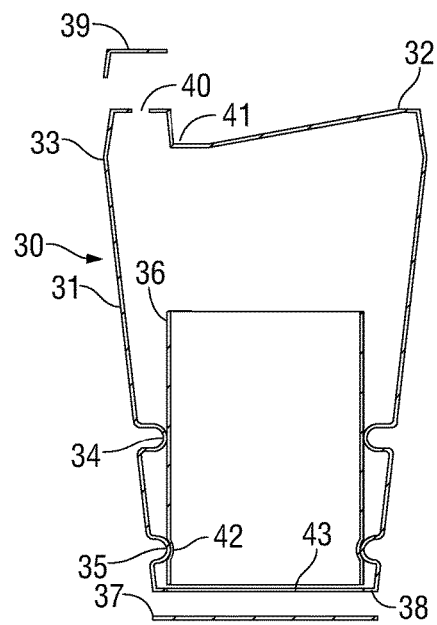
FIG. 9 is a cross-sectional view taken along the lines 9-9 of FIG. 8 illustrating an inductively heatable element within the package in accordance with an embodiment of the present disclosure.

FIGS. 8 and 9 show an alternate embodiment of the package in accordance with the present disclosure. In this embodiment, package 30 resembles a cup with a "sipper lid" such as may be available at a coffee shop. Package 30 includes container 31. Container 31 includes a contoured upper surface 32 and a frusto-conical sidewall 33, e.g., integrally formed of a thermoplastic material. An opening 40 is provided in upper surface 32, which allows a consumer to sip a beverage from package 30. Tab 39 covers opening 33 to hermetically seal package 30 prior to consumption. Upper surface 32 may include an indentation 41 adjacent to opening 40, which allows the consumer to comfortably engage his or her mouth around opening 40. In this embodiment, a generally tubular inductively heatable element 36 is located within container 31, and is held in place by protrusions 34 and ridge 35, which are formed into sidewall 33. An annular groove 42 is formed in inductively heatable element 36.

Groove 42 engages ridge 35 to securely attach inductively heatable element 36 to container 31. Inductively heatable element 36 and a beverage (not shown) are placed in package 30 through a bottom opening 43. Package 30 includes a sheet 37 that attaches to container 31 along flange 38 and forms part of the hermetically sealed package. Sheet 37 may be configured to be easily removable to facilitate separation of inductively heatable element 36 from container 31 for recycling.

Figure 10:
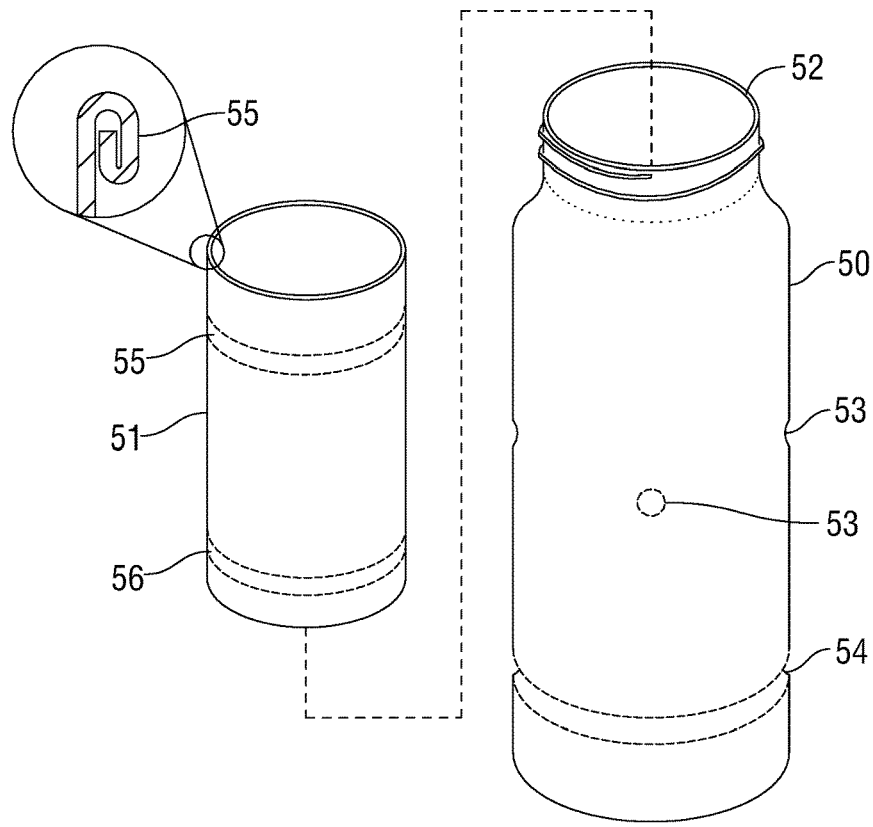
FIG. 10 is a perspective view of yet another embodiment of a package in accordance with the present disclosure.

FIG. 10 shows an alternative embodiment of a package in accordance with the present disclosure. In the embodiment illustrated in FIG. 10, container 50 is a relatively narrow thermoplastic bottle with a relatively wide mouth 52. Inductively heatable element 51 is a generally cylindrical piece of metal such as tinplate or polymer coated ECCS, e.g., comparable to the body of a common tin can. Inductively heatable element 51 is sized to fit into mouth 52 and lodges within container 50. In this manner, an upper groove 55, which is formed on inductively heatable element 51, engages protrusions 53 and lower groove 56 engages ridge 54, such that inductively heatable element 51 is held in place within container 50. Protrusions 53 fix inductively heatable element 51 within container 50 while allowing flow of liquid along both the inside and the outside surfaces of inductively heatable element 51. A cap and beverage (not shown) may be added to create a hermetically-sealed packaged foodstuff. In general, packaging metals such as tinplate are coated to minimize corrosion, but shearing along the edges of such sheet metal may expose the edges to corrosion. In some embodiments, the upper and lower flanges of inductively heatable element 51 are formed into a bead 55, which serves to shield the edge of the sheet metal from the corrosive effects of the beverage stored in the package.

Figure 11:
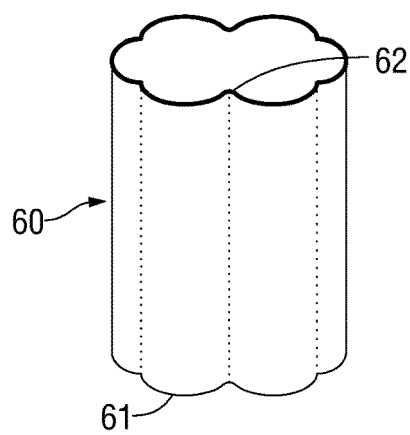
FIG. 11 is a perspective view of an inductively heatable element, shown in an expanded configuration, in accordance with the present disclosure.
Figure 12:
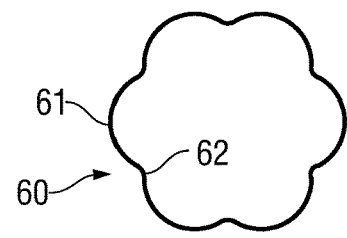
FIG. 12 is a top view of the inductively heatable element of FIG. 11 in accordance with the present disclosure.
Figure 13:
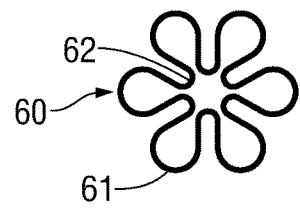
FIG. 13 is a top view of an inductively heatable element, shown in a compressed configuration, in accordance with an embodiment the present disclosure.

FIGS. 11-13 show an alternative embodiment of an inductively heatable element in accordance with the present disclosure. In the embodiment illustrated in FIGS. 11-13, a generally cylindrical inductively heatable element 60 is shown and includes a series of indentations 61 and flutes 62 that allow for compression of inductively heatable element 60 so that inductively heatable element 60 may be placed in a bottle (e.g., bottle 2 shown in FIG. 1). FIGS. 11 and 12 show inductively heatable element 60 in an expanded configuration. In this configuration, inductively heatable element 60 is expanded into a relatively large diameter, such that flutes 62 engage the interior wall of a bottle. FIG. 13 shows inductively heatable element 60 in a compressed configuration. In this configuration, indentations 62 are bent to an acute angle and flutes 61 are compressed, such that the diameter of inductively heatable element 60 is reduced to allow inductively heatable element 60 to be insertable into a bottle mouth (e.g., mouth 9 shown in FIG. 1).

Figure 14:
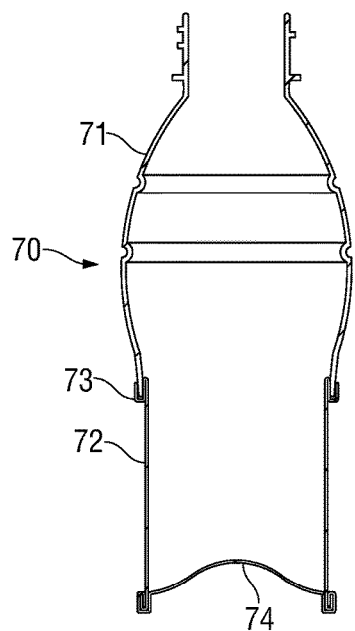
FIG. 14 is a cross-sectional view of a package in accordance with another embodiment of the present disclosure.
Figure 15:
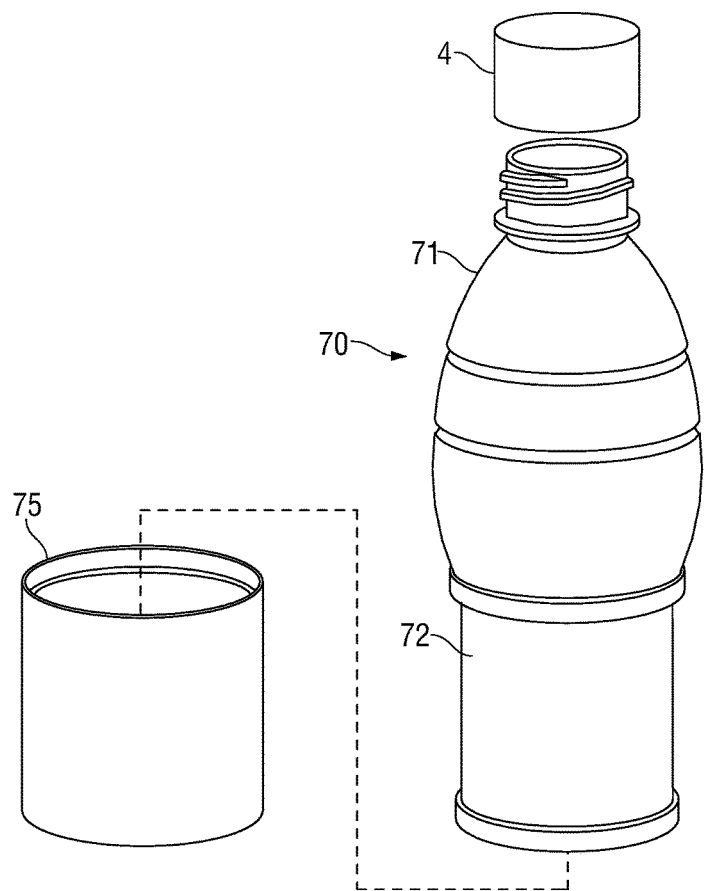
FIG. 15 is a perspective view of the package of FIG. 14 in accordance with an embodiment of the present disclosure.

FIGS. 14 and 15 show an alternative embodiment of a package in accordance with the present disclosure. In the embodiment illustrated in FIGS. 11-13, package 70 includes upper segment 71, which may be made of plastic, and lower segment 72, which may be made of metal. Insulating sleeve 73 is provided and may be made of cardboard. Beverage 5 may be disposed within package 70. Cap 4 may be provided. In some embodiments, the package bottom may be made of a non-heatable material.

Upper segment 71, lower segment 72 and cap 4 together form a hermetically sealed container for beverage 5. Insulating sleeve 75 is configured to protect a consumer from the heat from a hot beverage radiating through lower segment 72. Lower segment 72 may be formed from a single piece of material (e.g., akin to the can body of a 2-piece can without the can end).

Alternatively for example as shown in FIG. 14, lower segment 72 may be formed with a welded tubular can body and bottom end 74 (e.g., akin to a 3-piece can, without the top end). In embodiments wherein lower segment 72 is fabricated with a bottom end, such bottom end 74 may be made of a standard packaging metal or a non-inductive material, e.g., plastic. A non-inductive surface facilitates temperature measurement at the base of lower segment 72. In some embodiments, lower segment 72 is attached to upper segment 71 with a seam 73 formed between the top of lower segment 72 and bottom of upper segment 71.

Package 70 functions in a manner similar to package 1 of FIGS. 1-6. Instead of an inductively heatable element being warmed by the heating apparatus, lower segment 72 is warmed by the induction coil and, in turn, heats beverage 5. In some embodiments, plastic surfaces may be provided that are useful for consumer comfort, package design and effective temperature measurement and control. Upper segment 71, in particular, offers a surface with low thermal mass and which is not inductively heated. Consequently a temperature measurement taken at the exterior of upper segment 71 closely approximates the temperature of beverage 5 adjacent to the point at which such temperature measurement is taken.

Figure 19:
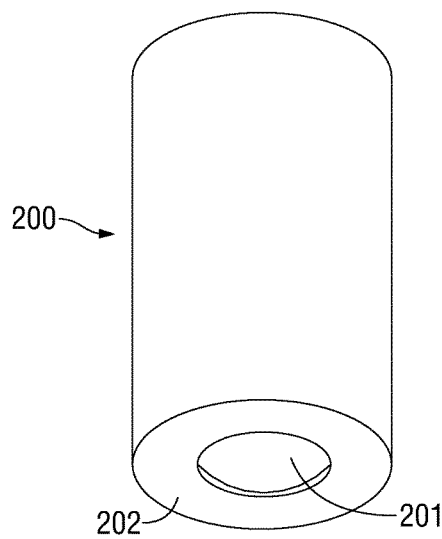
FIG. 19 is a perspective view of an inductively heatable element including a finger hole in accordance with the present disclosure.
Figure 20:
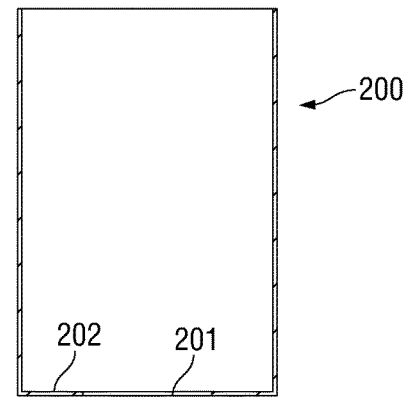
FIG. 20 is a cross-sectional view of the inductively heatable element of FIG. 19 in accordance with another embodiment of the present disclosure.

FIGS. 19 and 20 show an alternative embodiment of an inductively heatable element in accordance with the present disclosure. In the embodiment illustrated in FIGS. 19 and 20, inductively heatable element 200 includes a finger hole 201 that facilitates the insertion and/or removal of inductively heatable element 200 from a bottle. Inductively heatable element 200 has a generally tubular shape, and may resemble a jar with a hole in its bottom. Inductively heatable element 200 may be fabricated in a manner similar to a can body, e.g., a sheet of tinplate or coated tin-free steel is formed into a cup shape through a draw-redraw, drawn and ironed, or welding and seaming process. A portion of the bottom wall is removed by any suitable process, e.g., stamping and/or machining. This results in an inductively heatable element 200 with an annular bottom wall 202 defining a hole 201 therethrough. Hole 201 is configured to allow a consumer to place his or her finger into hole 201 and grip bottom wall 202 to easily remove inductively heatable element 200 from a bottle. Once separated, inductively heatable element 200 may be recycled (e.g., metal material) and the bottle recycled (e.g., plastic material). The edges of inductively heatable element 200 may be curled, hemmed, or otherwise formed to seal any cut ends from corrosion and/or provide blunted surfaces for human contact.

Figure 21:
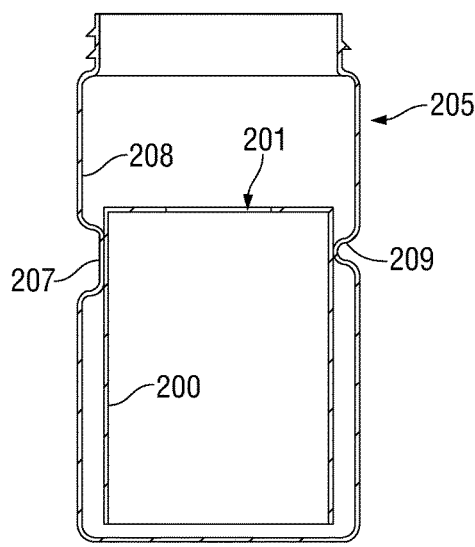
FIG. 21 is a cross-sectional view of a package in accordance with another embodiment of the present disclosure.
Figure 22:
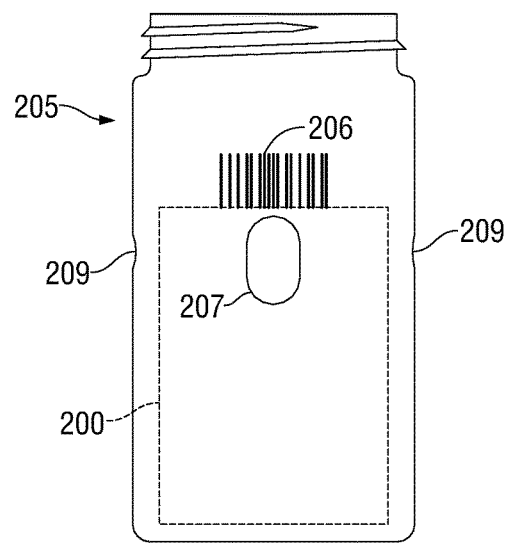
FIG. 22 is a perspective view of the package of FIG. 21 in accordance with an embodiment of the present disclosure.
Figure 23:
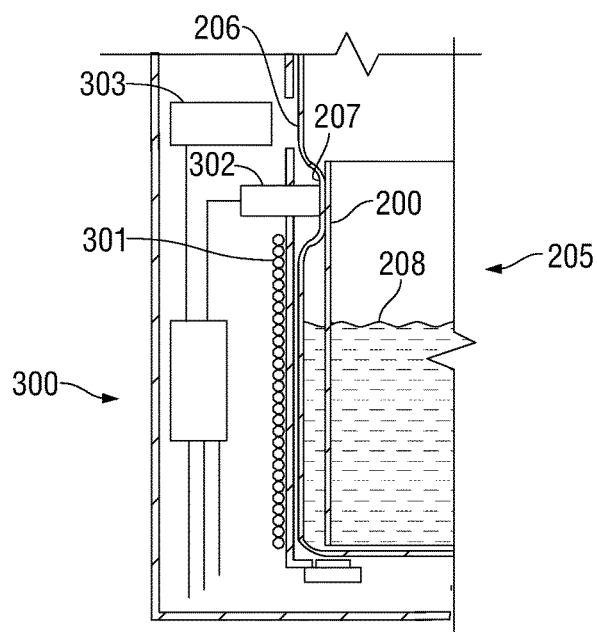
FIG. 23 is a cross-sectional view of a portion of a package and heating apparatus in accordance with another embodiment of the present disclosure.

FIGS. 21-23 illustrate an embodiment of an inductively heatable element and a bottle in accordance with the present disclosure. Such configuration allows the heating apparatus to detect a partially-filled package 205 by sensing the temperature of the inductively heatable element 200 above a liquid line. The ability to detect a partially-filled package is useful both for safety and convenience. Upon detection of partially-filled package, the heating apparatus 300 may discontinue heating or switch to a lower power setting to avoid overheating.

A bar code may be provided on the side of the bottle 208. Although a bar code is used as an example, other coding systems may additionally, or alternatively, be used (e.g., QR code, Data Matrix, RFID, etc.). As seen in FIG. 22, the exterior of package 205 includes a bar code 206 and a probe indent 207. Inductively heatable element 200 is located within a bottle 208 and is held in place by probe indent 207 and positioning indents 209. Since inductively heatable element 200 is frictionally engaged with probe indent 207, if inductively heatable element 200 rises in temperature, probe indent 207 will also rise in temperature relatively quickly.

FIG. 23 shows package 205 operably coupled to heating apparatus 300. Heating apparatus 300 is comparable to heating apparatus 200 illustrated in FIGS. 5 and 6. However, in this case, the top portion of inductively heatable element 200 extends above coil 301. Heating apparatus 300 includes a thermo-probe 302 that is positioned to measure the temperature inside the probe indent 207 at a point adjacent to where probe indent 207 abuts inductively heatable element 200. Thermo-probe 302 may be of several types. For example, thereto-probe 302 may be a thermistor, in which case thermistor thermo-probe 302 would be placed in physical contact with probe indent 207 adjacent to inductively heatable element 200. Alternatively, thermo-probe 207 may be an infrared thermometer, in which case the infrared beam would be directed at the portion of probe indent 207 adjacent to inductively heatable element 200.

In FIG. 23, a partially-filled package 205 is shown with beverage 208 rising partially up the side of inductively heatable element 200. If coil 301 were to be activated in this situation, then the portion of inductively heatable element 200 that is above the level of beverage 208 would tend to increase in temperature very rapidly; coil 301 is transferring energy into inductively heatable element 200, but no liquid is present to cool the top portion of inductively heatable element 200. This is a potentially dangerous (or at least unpleasant) situation.

With thermo-probe 302 positioned in close contact or proximity to probe indent 207 and inductively heatable element 200, the control system of the heating apparatus would be able to quickly detect a rapid rise in temperature and disable coil 301. The configuration illustrated in FIG. 23 may add to the safety of the heating apparatus. Heating apparatus 100 shown in FIGS. 5 and 6 includes scale 108, which measures the weight of the package and serves to detect a partially-filled package. The temperature-based technique of detecting a partially-filled package described here could augment the use of a scale for this purpose or eliminate the need for one. Scale 108 shown in FIG. 6 is in direct contact with package 1.

In an alternative configuration of the heating apparatus, a scale may be located on a foot of the heating apparatus, or elsewhere, to detect the combined weight of the heating apparatus and any package placed in it. Thus configured, the heating apparatus can infer the weight of any package, without the need for a scale that comes into direct contact with a package.

It is to be understood that either a single or multiple thermo-probe(s) may be used in any of the presently-disclosed heating apparatus embodiments. FIG. 6 shows a thermo-probe 109 that is away from inductively heatable element 3, whereas FIG. 23 shows a thermo-probe 302 that is close to inductively heatable element 200. It may be advantageous to have thermo-probes configured in both positions and use both temperature readings as inputs into the control protocol of the heating apparatus.

FIGS. 21 and 23 show how a bar code 206 may be used in the functioning of the presently-disclosed heating apparatus embodiments. Bar code 206 is positioned above thermo-probe indent 207 on package 205. Correspondingly, a bar code reader 303 is positioned above thermo-probe 302 in heating apparatus 300. When package 205 is inserted correctly into heating apparatus 300, bar code 206 is positioned adjacent to bar code reader 303. Bar code 206 may be read by heating apparatus 300 before or during the heating process to identify the amount and nature of the beverage in the package, and adapt the control protocol of heating apparatus 300 accordingly.

Positioning of the bar code and reader as described above may provide an additional level of convenience for the consumer, e.g., the consumer does not need to consciously locate a bar code on a package and wave it in front of a reader on the heating apparatus. The shapes of package 205 and heating apparatus 300 may be designed such that, when a consumer begins to insert package 205 into heating apparatus 300, package 205 tends to slide and/or rotate into the correct position within heating apparatus 300 for bar code reader 303 and thermo-probe 302 to function correctly. For example, grooves may be placed on package 205 that correspond to protrusions in heating apparatus 300, which guide package 205 into the correct position within the heating apparatus cavity.

Figure 24:
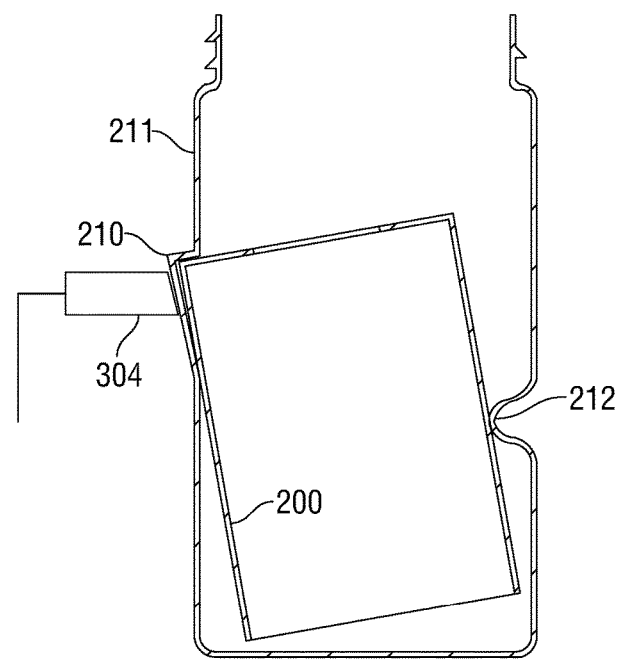
FIG. 24 is a cross-sectional view of a package and inductively heatable element in accordance with yet another embodiment of the present disclosure.

FIG. 24 shows an alternative thermo-probe/bottle/inductively heatable element configuration. In this configuration, the top of inductively heatable element 200 fits into a convex protrusion 210 which extends outwardly from vessel 211 (in contrast to the inward/concave probe indent 207 show in FIGS. 21 to 23). Thermo-probe 304 is positioned adjacent to protrusion 210. This geometry may be advantageous if a shrink sleeve or other label is used as part of the package (e.g., as a label that includes the bar code). In the case of a concave indent 207 (as shown in FIGS. 21 to 23), a label may tend to span indent 207 and block thermo-probe 302. In contrast, a label such as a shrink sleeve would tend to conform tightly to a convex protrusion 210 and minimally impede the placement and function of a thermo-probe 304.

Figure 25:
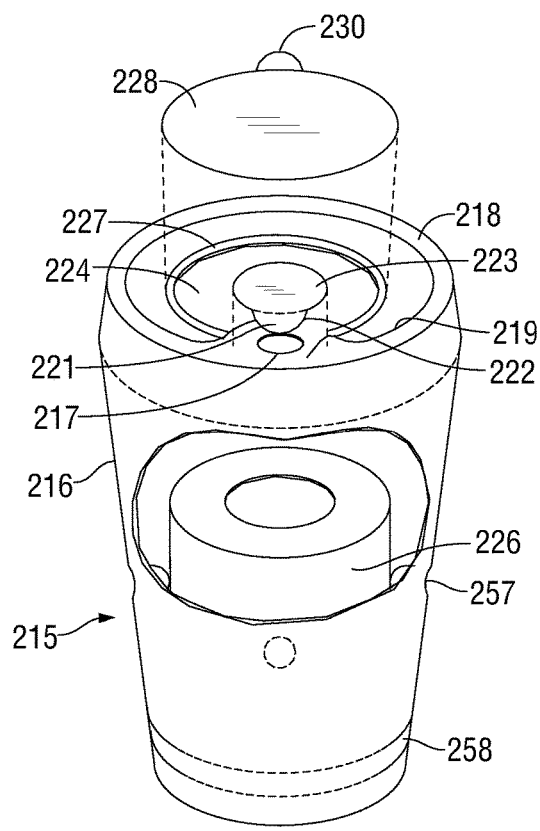
FIG. 25 is a perspective view in partial cutaway of another embodiment of a package in accordance with the present disclosure.
Figure 26:
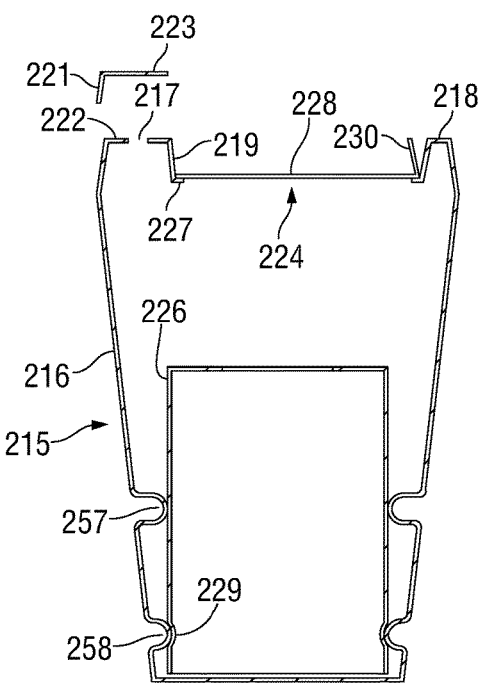
FIG. 26 is a cross-sectional view of the package of FIG. 25 in accordance with another embodiment of the present disclosure.

FIGS. 25 and 26 illustrate an embodiment that includes unitary cup-shaped vessel 216, with a contoured top. Package 215 comprises a vessel 216 formed of thermoplastic material. The topmost portion of vessel 216 is contoured to resemble a "sipper lid" and includes a sip hole 217 on its top surface 218. A recessed area 219 extends downward from top surface 218 adjacent to sip hole 217 to accommodate a consumer's lips as he or she consumes a beverage. The portion of top surface 218 around sip hole 217 forms a planar flange 222. Sip sheet 223 is attached to flange 222 to seal sip hole 217 and form part of the hermetically sealed package 215 prior to use. An access hole 224 is located on the top of vessel 216. As illustrated in FIGS. 25 and 26, access hole 224 is located within recessed area 219. In other embodiments, an access hole is located on the top surface of the vessel. Access hole 224 is configured to permit the insertion and removal of inductively heatable element 226 into vessel 216. An access hole flange 227 extends around the perimeter of access hole 224 and provides a surface for access sheet 228 to be attached to vessel 216. Prior to consumer use, access sheet 228 covers access hole 224 to hermetically seal the contents of the package. Inductively heatable element 226 is sized to fit into access hole 224 and lodges within vessel 216. In this manner, a groove 229, which is formed on inductively heatable element 226, engages ridge 258 formed in vessel 216 and indentations 257 abut inductively heatable element 226, holding inductively heatable element 226 is held in place within vessel 216. Protrusions 257 and ridge 258 fix inductively heatable element 226 within vessel 216 while allowing flow of liquid along both the inside and the outside surfaces of inductively heatable element 226.

In use, a consumer removes sip sheet 223 prior to consuming the beverage located within the package. Sip sheet tab 221 provides the consumer a grip surface for sip sheet 223. After the consumer is finished with the beverage, access sheet 228 may be removed by gripping tab 230 and pulling it. Then inductively heatable element 226 may be removed through access hole 224. Thus a metallic inductively heatable element 226 may be easily separated from a plastic vessel 216 for separate recycling.

FIGS. 27-30 illustrate a variation of a screw cap in accordance with the present disclosure. The screw cap features a hole that is covered by a removable tab. The screw cap may include a contoured surface, e.g., configured to resemble a sipper lid.

Figure 27:
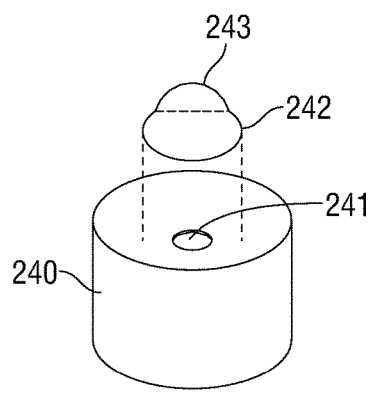
FIG. 27 is a perspective view of a bottle cap in accordance with another embodiment of the present disclosure.
Figure 28:
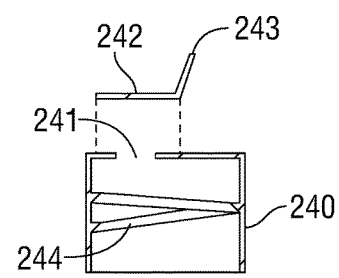
FIG. 28 is a cross-sectional view of a bottle cap in accordance with another embodiment of the present disclosure.

FIGS. 27 and 28 show a narrow diameter bottle cap 240. A hole 241 is provided in cap 240. A removable sheet 242 is attached to the upper surface of cap 240 and seals hole. Sheet 242 includes a tab 243 which a consumer may grip to more easily remove sheet.

Figure 29:
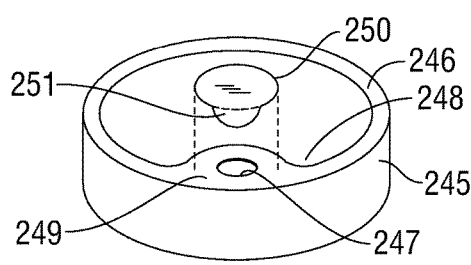
FIG. 29 is a perspective view of a sipper-lid screw cap in accordance with another embodiment of the present disclosure.

Threads 244 enable the cap to be screwed onto an appropriate bottle. FIG. 29 shows a sipper-lid screw cap 245. In this case, the surface of the cap 245 is contoured to resemble a sipper lid. As such, it includes a top surface 246 around its perimeter and a hole 247 through which a beverage may be sipped. A planar flange 249 is located on top surface 246 and immediately surrounds hole 247. Flange 249 and provides a surface to which sheet 250 may be attached. A removable sheet 250 is attached to the upper surface of cap 245 and seals hole 247. A recessed area 248 is located adjacent to the flange 249 configured accommodate a consumer's lips. Sheet 250 includes a tab 251 that a consumer may grip to easily remove sheet 250.

Figure 30:
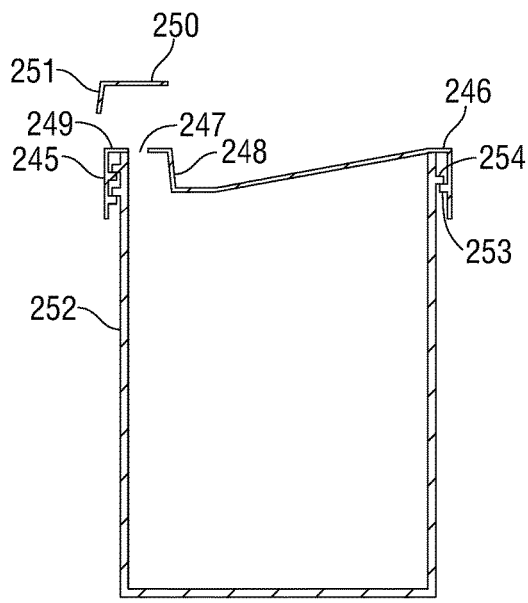
FIG. 30 is a cross-sectional view of a package including the sipper-lid screw cap of FIG. 29 in accordance with another embodiment of the present disclosure.

FIG. 30 shows sipper-lid screw cap 245 as it is attached to vessel 252. Lid threads 253 correspond to vessel threads 254 to attach cap 245 to vessel 252. The presently-disclosed screw cap embodiments may be used in different ways. Such screw cap may be simply unscrewed without removing the tab, and the contents of the container accessed through the threaded mouth. Alternatively, a consumer may remove the tab and sip the beverage from the container through the hole.

Accessing the container contents through the threaded mouth, may be useful for: adding ingredients to the container (e.g., initial filling, or a consumer adding cream or sugar to coffee); placing or removing the metallic inductively heatable element into the container; providing the consumer with reclosable access to the container; and providing the consumer with the experience of a wide-mouthed beverage container (e.g., a coffee mug or bottle).

Accessing the beverage through the hole may provide the consumer with benefits characteristic of a sipper lid, including the ability to sip at the beverage and limited spillage while the container is being moved. The presently-disclosed screw cap may have usefulness to a wide variety of vessels.

Figure 31:
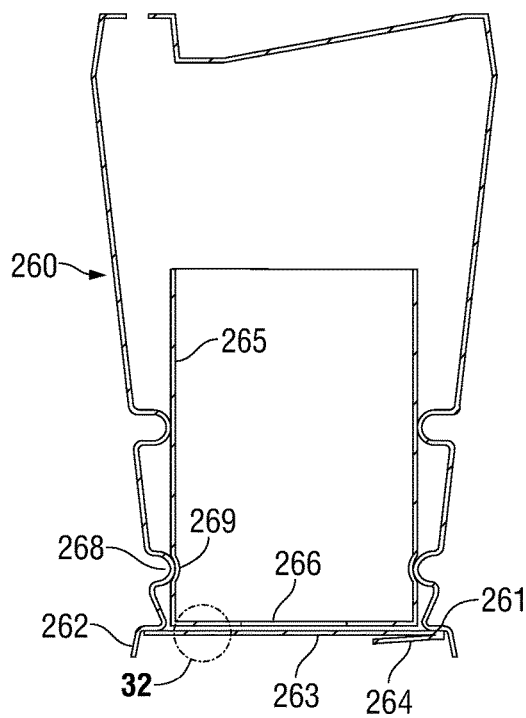
FIG. 31 is a cross-sectional view of a package configured to allow an inductively heatable element to be removed from the bottom of the package in accordance with another embodiment of the present disclosure.

FIG. 31 shows a package 260 in which inductively heatable element 265 may be removed from the bottom of package 260. A sealing sheet 263 is attached to a vessel 260 along a flange 261 that is formed as part of and located near the bottom of vessel 260. Flange 261 and sheet 263 are elevated from the bottom of package 260 by foot 262. As shown, foot 262 is generally toric in shape and formed as part of vessel 260. When package 260 is filled with liquid, the hydraulic pressure of the liquid may tend to bow sealing sheet 263 downward, potentially destabilizing vessel 260 as it sits upon a table or other surface. The presence of foot 262 allows sealing sheet 263 to bow outward, without upsetting the balance of the package 260 on a flat surface.

Figure 32:
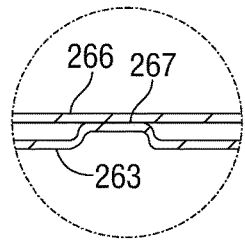
FIG. 32 is an enlarged, cross-sectional view of the indicated area of detail of FIG. 31 in accordance with another embodiment of the present disclosure.

In this embodiment, inductively heatable element 265 is formed such that it has a bottom wall 266. Sealing sheet 263 may be attached to the bottom wall 266 to facilitate removal of inductively heatable element 265 for recycling after the beverage has been consumed. FIG. 32 shows a region of FIG. 31 wherein bottom wall 266 is attached to sealing sheet 263 along region 267. There are several potential means of attachment, for example sealing sheet 263 may be fabricated using a material (e.g., polypropylene) that may be heat sealed to a coating on inductively heatable element 265 (e.g., polypropylene).

Figure 33:
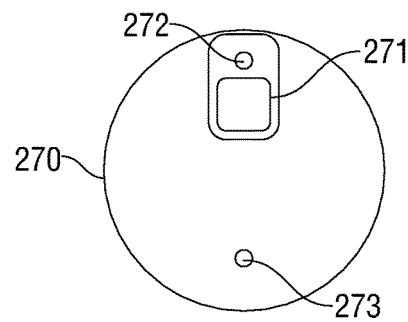
FIG. 33 is a schematic view of a sealing sheet in accordance with an embodiment of the present disclosure.

A variant of a sealing sheet is illustrated in FIG. 33. In this embodiment, a rigid or semi rigid material (e.g., poly-coated packaging metal) is used to form sealing sheet 270. The sealing sheet 270 includes a tab 271, which serves as a finger hold and lever for prying sealing sheet 270 free of the vessel. Tab 271 is attached to sealing sheet 270 by a rivet formed in sealing sheet 270. Sealing sheet 270 may be attached to the bottom wall 266 of inductively heatable element 265 by a rivet 273 formed in sealing sheet 270.

Figure 34:
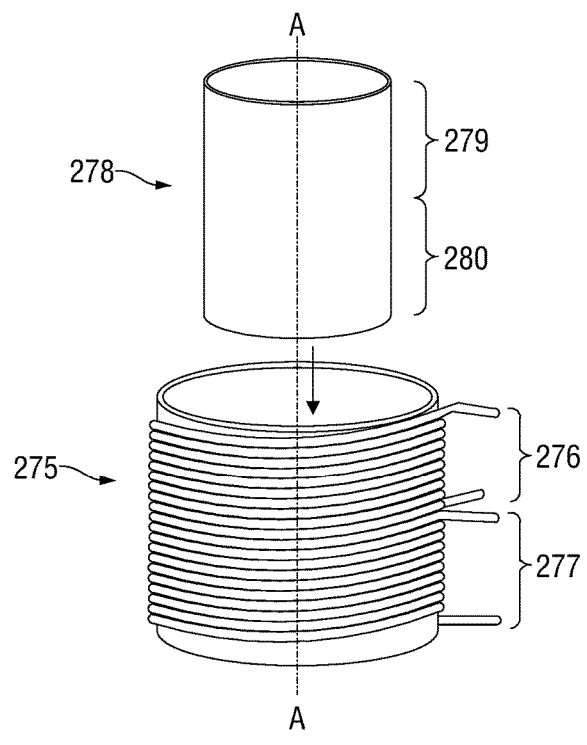
FIG. 34 is a perspective view of coil configuration in accordance with an embodiment of the present disclosure.
Figure 35:
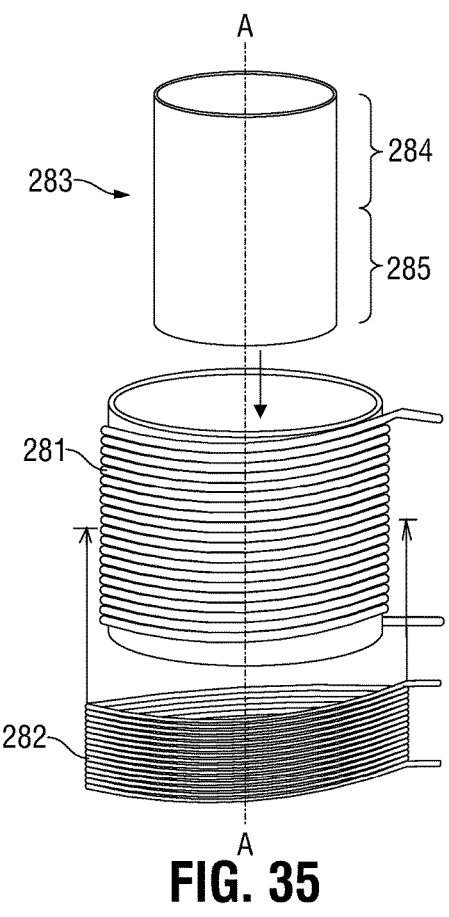
FIG. 35 is a perspective view of coil configuration in accordance with another embodiment of the present disclosure.

FIGS. 34 and 35 show alternative coil geometries in accordance with the present disclosure. In both of these configurations, two coils are used rather than one to focus energy transfer into a targeted region of an inductively heatable element within a package. Doing so, may enhance the heating of a partially-filled package; facilitate operation of a heating apparatus with differing sized and shaped inductively heatable elements within a package; and/or facilitate heating apparatus operation at different power settings.

FIG. 34 shows a coil 275 that includes an upper coil 276 and a lower coil 277. A heating apparatus may be configured to direct high frequency current to either or both of the coils to achieve a desired result. For example, lower coil 277 may be activated alone, which would tend to focus energy on the lower portion 280 of inductively heatable element 278. This might be useful for a partially-filled vessel, where the liquid level within the vessel does not completely cover the upper portion 279 of inductively heatable element 278. Alternatively, both upper coil 276 and lower coil 277 may be energized together (either in series or in parallel), directing energy at both upper portion 279 and lower portion 280 of inductively heatable element 278. This configuration would be useful, for example, for rapidly heating the contents of a large or full package.

FIG. 35 shows a heating apparatus configuration with a tall coil 281 and a short coil 282. In this case, short coil 282 is coaxially disposed around the lower portion of tall coil 281. In operation, short coil 282 could be used to direct energy at lower portion 285 of inductively heatable element 283, while tall coil is used to direct energy at both the upper portion 284 and lower portion 285 of inductively heatable element 283. Short coil 282 might be used at lower power settings or partial fill levels, while tall coil 281 is used for high heat settings and/or full packages.

In both the configurations described above, the differing coils might be used for differing sizes and shaped inductively heatable elements. For example, a half-height inductively heatable element (used in conjunction with lower coil 277 or small coil 282) might be used for a small vessel and servings size, while full sized inductively heatable element may be used for a large vessel and serving size.

Additional features of the heating apparatus may include: consumer-adjustable heat settings (e.g., 140 F to 160 degrees F., final temperatures); start timers (e.g., that allow the beverage to be heated and ready at a specified time); different heating cycles for different foodstuffs (e.g., optimal power settings may be different for coffee than for soup); and/or different controls with which to program or operate the unit; and connectivity to a computer (e.g., WiFi to an iPhone) to program or operate the unit.

Additional features of the package may include: different sizes; different configurations for the container opening (e.g., wide opening for soup, narrow for beverages, and "sipper" lids); grooves on the container for insulation; the addition of an insulating sleeve; and/or packaging graphics on a label or shrink sleeve.

The plastic portion of the package may be made from a plastic commonly used in the packaging industry and approved for food contact. Polypropylene (PP) offers high heat resistance and is often used for bottles undergoing retort sterilization. Polyethylene terephthalate (PET) that has been heat-set molded also has reasonably high temperature tolerance, and may be suitable for hot-fill and aseptic packaging operations. Polyethylene (PE) is another option.

The inductively heatable element would likely be made from a corrosion resistant ferritic metal such as tinplate, tin-free steel, or AISI 430 stainless. A packaging steel such as polymer-coated ECCS is expected to prove most economical and functional. Ferritic or martensitic stainless steels offer corrosion resistance and may also be used. It is contemplated that non-magnetic metals such as aluminum or austenic stainless be used, though these are more difficult to heat inductively.

In some embodiments, the inductively heatable element is a curved, generally tubular, sheet of metal. It is to be understood that various alternative geometries of the inductively heatable element as situated in the container may also be used. Some examples include: a tubular section (e.g., a can body); different heights (e.g., as measured from base of container); different overall sizes (surface area and thickness) for various container sizes and desired heating rates; corrugations or flutes (e.g., to increase surface area for a given height); spirals (e.g., remaining in the geometry of inductively heatable element 3*a* of FIG. 3); simple planar sheet(s); and multiples or combinations of various shapes.

Although a single-layer helically-wound coil is shown, a variety of coil geometries may be utilized within the presently-disclosed heating apparatus embodiments. For example, the coil may be wound as a bundle so that it has multiple axial layers extending radially (like a spool of thread). Further, the coil may be a wide variety of other geometries, e.g., saddle-shaped.

In some embodiments, the heating apparatus is a table-top device. In other embodiments, the heating apparatus may be used in connection with a vending machine, automobile, institutional (office, convenience store, food service, etc.) or other environment.

The presently-disclosed heating apparatus embodiments may utilize known electronics technology to generate the high-frequency alternating current to energize the coil. Typically such power supplies are based on one or more inverter circuits.

Embodiments of the presently-disclosed heating apparatus may utilize a variety of control logic for the control of the heating apparatus. For example, a control logic that simply ends the heating cycle when an end-point temperature is reached may be used.

In some embodiments, an agitator or mixer may be built into the package and heating apparatus. A variety of systems to agitate the package during the heating cycle in order to evenly heat the liquid contained in the package may be used. For example, mixing may be accomplished by adding an oscillating device to the heating apparatus that engages a spline in the bottom of the container and rotates the container axially during the heating cycle. Mixing could be enhanced by paddles formed in the sidewall of the container and/or the inductively heatable element. Another way to achieve mixing could be to make the inductively heatable element movable within the container, and then use electromagnets to rock or shake the inductively heatable element during the heating cycle.

The package could contain various foodstuffs in various portions. It may be desirable to have different heating control cycles for these variations in content and portion. For example, it may be better to heat a viscous and/or milk-based products (e.g., cappuccino) more slowly than other products (e.g., tea). Consequently, it may be useful to incorporate a product-sensing device into the heating apparatus's control circuit to determine the correct heat setting to use (e.g., bar codes and RFD chips).

In some embodiments, the heating apparatus is adapted to detect the package and adjust its control protocol. For example, the controller could use one or a combination of the following elements to discriminate between different packages. The inductively heatable element can made different sizes and shapes. And the amount of energy drawn by the inductively heatable element from the coil depends on the inductively heatable element's size and shape. For example, if the power generator is set to a given notional power setting (e.g., 1500 Watts), then a 20 square inch inductively heatable element might draw the entire 1500 Watts (12.5 Amps at 120 Volts). However, a 10 square inch inductively heatable element might draw only 1000 Watts (8.3 Amps at 120 Volts). In some embodiments, the heating apparatus includes a current sensor. In such case, the controller may be able to detect the difference between a small or large inductively heatable element (or other sizes for that matter) and adapt the control protocol accordingly.

In practice, it may be useful to make some products with a large inductively heatable element (e.g., a large serving of a type of beverage that can be quickly heated) and to make other products with a small inductively heatable element (e.g., a small serving of a beverage and/or a beverage type that benefits from slower heating).

The weight measurement taken by a scale may be used as one data point for the controller to identify the package's content, e.g., in addition to being used to determine heat time.

Various sensors may be located within the cavity that detect the container's shape and communicate this information to the controller. For example, containers may be made with differently shaped push-ups or bases, and physical sensors could detect the shape of the push-up or container base.

In using the presently-disclosed package and heating apparatus, consumers may be in direct contact with a heating apparatus that generates substantial energy and packages that may become very hot. Consequently great care is needed to design a product that ensures customer safety. Such safety measures should make reasonable allowance for the potential failure of system components and the potential misuse of the system by the consumer.

A variety of components and features are routinely designed into electronic devices to increase their safety. These include: electrical fuses, thermal fuses, cord management and other components. Similarly, consumer packages for foodstuffs include a variety of known elements to enhance safety, including tamper-evident packaging, thermal insulation and child-proof packaging.

The presently-disclosed control system embodiments are primarily a safety feature. Temperature probes and control logic may be used to determine the upper temperature of the beverage. Control logic for presently-disclosed heating apparatus embodiments may limit this temperature as well as recognize and respond to different error states, and communicate information to the receiver.

As described herein, the presence of a protrusion in the heating apparatus that would correspond to a push-up in the package. The protrusion would preclude the heating apparatus from functioning when certain inappropriate objects (e.g., flat-bottomed metal cans) are inserted into the heating apparatus. Alternative or additional features can be added to enhance this basic concept. For example, the cavity of the heating apparatus and base of the package could be made with an oval cross section (instead of round) thus precluding an even greater set of inappropriate objects.

In some embodiments, the heating apparatus may be adapted to detect unwanted objects in the cavity electronically. For example, electrical contacts could be placed on the bottom of the cavity (e.g., on or around the protrusion) to detect if a metal can was placed in the cavity instead of the plastic package. Also, the electrical current sensing feature may be used to detect inappropriate objects. As described above, a current sensor could detect the amount of current flowing through the coil at a given power setting. If the measured current did not match an expected level, then the controller could disable the device.

A mechanical device could be installed in the heating apparatus that allows the controller to lock the package into the cavity. For example, one or more electromechanically actuated pins or bars could be added to the heating apparatus such that they insert into a ridge, protrusion, curve or another geometric aspect of the package. Such a feature would prevent the consumer from removing the package from the heating apparatus before the heating cycle is completed or from removing the package if it inadvertently becomes overheated.

It may be desirable for a specific portion of container 2 to be manufactured with a "blow-out" point (or weakened area) in an appropriate location. For example, the plastic container may be formed with a bottom section that ruptures at 5 PSIG, when the rest of the container ruptures in excess of 10 PSIG. Thus, if the container is subjected to overpressure (e.g., heating apparatus runs amok with cap left on), then the container will rupture at the bottom and the hot contents would be contained in the cavity rather than potentially spraying onto the consumer.

It may be desirable for the unit to be operable only if the cap is removed. For example, it may prove that a hermetically sealed package for some (e.g., carbonated) beverages creates a risk of over-pressure and rupture of the package at high temperatures. In other cases, it may be advantageous for the heating apparatus to be operable only if the cap has never been removed. For example, it may prove dangerous for a package that has been emptied of its fluid contents to be used in the heating apparatus. In either of these cases, it may be useful to have a device attached to the controller that senses whether a cap is in place or has ever been removed prior to insertion in the heating apparatus.

Still beverages heated to the temperatures contemplated (e.g., 140 to 150 degrees F.) may not pose an over pressure risk. Further, the scale sensor may be set to a minimum weight setting to prevent the use of an empty package in the heating apparatus. So this particular feature would likely serve as a secondary or tertiary safety device and as such may not prove useful.

A feature may be built into the control circuit which alerts the consumer if the temperature of the package exceeds a safe level. This message could be communicated through one or a combination of an audible alert and/or a visual alert (e.g., flashing light or message on the screen).

As noted previously, the package may be hot-filled, aseptically filled or retorted to allow different products (tea, coffee with milk, etc.) to be stored at room temperature and/or for extended periods. Notably, the beverage within the package of may be processed (e.g., cooked or sterilized) in situ by heating the package inductively using the inductively heatable element (or lower segment, as the case may be) as part of the manufacturing process.

As noted above, the heating apparatus may be configured in a variety of manners with a variety of control protocols ranging from simple to complex. This section describes control schematics for the heating apparatus, including novel features of the heating apparatus such as a package locking mechanism and the use of complex/fuzzy logic.

Figure 16:
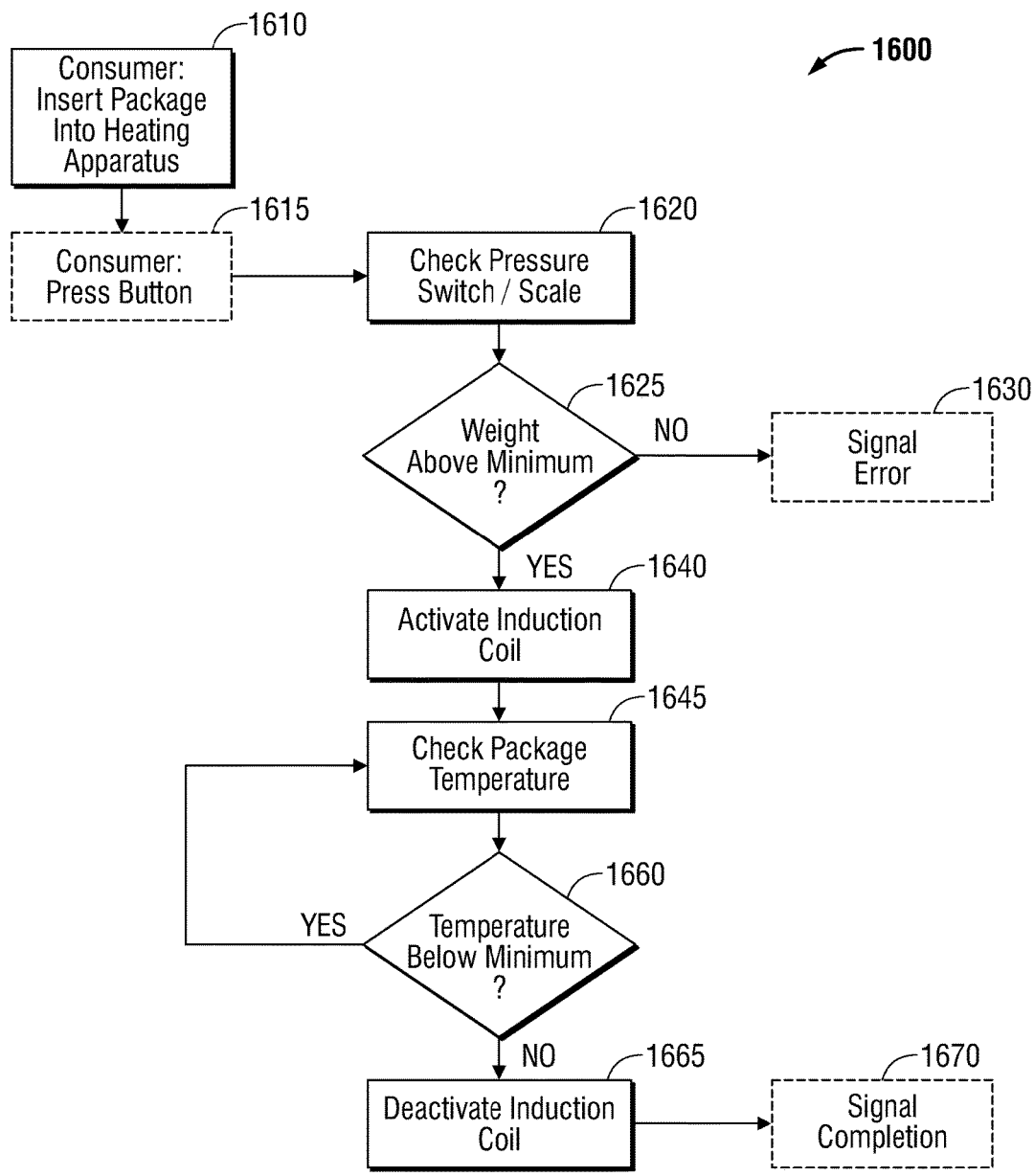
FIG. 16 shows a flowchart illustrating a process of heating a package in accordance with an embodiment of the present disclosure.

FIG. 16 shows a flowchart illustrating a process (shown generally as 1600) of heating a package in accordance with an embodiment of the present disclosure. In one embodiment the process 1600 is executed by one or more sequence of instruction that causes various elements of a presently-disclosed heating apparatus embodiment to perform the described actions. In one non-limiting example described below, the process 1600 is applied using the heating apparatus 100 shown in FIGS. 5 and 6.

At block 1610, a consumer inserts the package into the heating apparatus (e.g., package 1 shown in FIGS. 5 and 6). At block 1615, the consumer presses (or otherwise activates) switch 104 to activate the heating apparatus 100. In another embodiment, a display may be provided that includes a touchscreen that is operative to activate the heating apparatus 100. At block 1620, a pressure switch or scale tests package 1 to determine if its weight is above a predetermined minimum weight. In one non-limiting example, scale 108 is used to determine if package 1 weighs more than eight ounces. At block 1625, a determination is made whether the weight of the package is less than the predetermined minimum weight. If it is determined that the weight of the package is less than the minimum weight, then, at block 1630, an error is signaled. For example, display 105 may display a message such as "Bottle is underweight. Please insert a full bottle." If it is determined, at block 1625, that the weight of package 1 is greater than the predetermined minimum weight, then, at block 1640, the induction coil is activated.

At block 1645, the temperature of the package is measured. At block 1660, a determination is made whether the temperature of the package is below a minimum level. For example, a minimum level might be 145 degrees F. If it is determined, at block 1660, that the package temperature is below a minimum level, then the temperature of the package is checked again, at block 1645. If it is determined, at block 1660, that the package temperature is above a minimum level, then, at block 1665, the induction coil is deactivated. At block 1670, a signal may indicate the completion of the process. In the heating apparatus embodiment illustrated in FIGS. 5 and 6, if temperature probe 109 detects that the temperature of package 1 is below a minimum of 145 degrees F., then coil 101 will remain activated and temperature probe will continue to measure the temperature of package 1, until a temperature of 145 degree F. is reached. When the package temperature is above a minimum level, coil 101 will be deactivated, and a message may be displayed on display 105.

Figure 17:
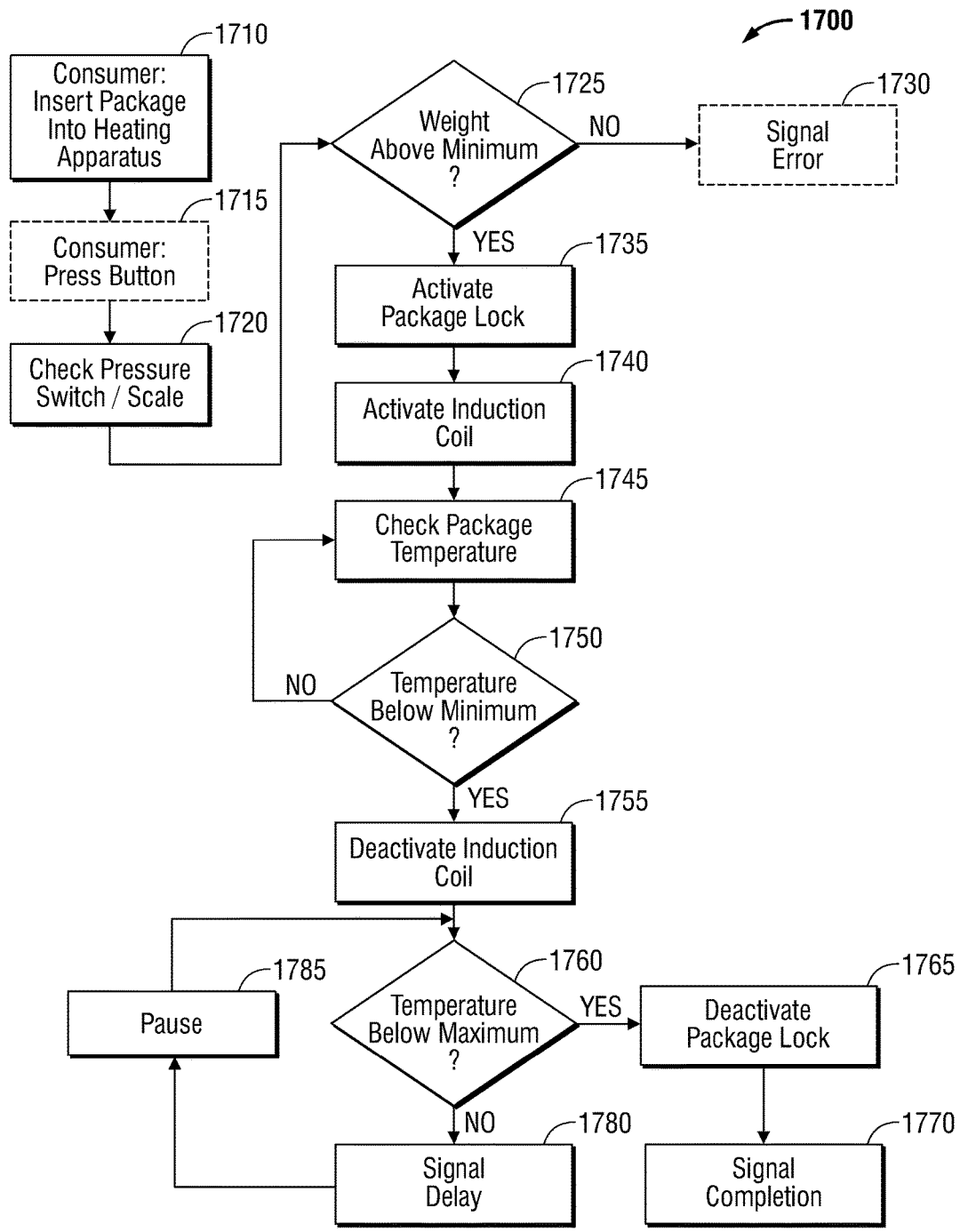
FIG. 17 shows a flowchart illustrating a process of heating a package in accordance with another embodiment of the present disclosure.

FIG. 17 shows a flowchart illustrating a process (shown generally as 1700) of heating a package in accordance with an embodiment of the present disclosure that incorporates a lock which secures the package to the heating apparatus until the heating cycle is complete. In one non-limiting example described below, the process 1800 is applied using the heating apparatus 3800 shown in FIGS. 38 and 39, wherein latch 3806 is operative to function as the package lock indicated in process 1700.

At block 1710, a consumer inserts the package into the heating apparatus. At block 1715, the consumer presses (or otherwise activates) switch 104 to activate the heating apparatus. Additionally or alternatively, as described herein, the heating apparatus may be activated by voice or other means of activation. At block 1720, a pressure switch or scale tests the package to determine if its weight is above a critical level. For example, scale 3910 may be used to determine if package 3601 weighs more than eight ounces. At block 1725, a determination is made whether the weight of the package is less than a predetermined minimum weight. If it is determined, at block 1725, that the package weight is less than a predetermined minimum weight, then, at block 1730, an error is signaled. In the embodiment illustrated in FIGS. 38 and 39, display 105 may provide a message such as "Bottle is underweight. Please insert a full bottle." If it is determined, at block 1725, that the package is above the predetermined minimum weight, then, at block 1740, the induction coil(s) is/are activated. At block 1745, the temperature of the package is measured. At block 1750, a determination is made whether the package temperature is below a minimum level. If it is determined that the package is below a minimum level then process 1700 cycles back to block 1745 to check the package temperature again.

If it is determined, at block 1750, that the package temperature is above a minimum level, then, at block 1755, the induction coil is deactivated. In the embodiment illustrated in FIGS. 38 and 39, if infrared thermometer 3813 detects that package 3601 is below a minimum of 145 degrees F., coil 101 will remain activated and temperature probe will continue to measure the temperature of package 3601, until a temperature of 145 deg. F is reached. Then upper coil 3917 and/or lower coil 3918 will be deactivated.

At block 1760 a determination is made whether the package is below a maximum temperature. If it is determined, at block 1760, the package is above a predetermined maximum temperature level, then block 1780 signals a delay. In one non-limiting example, the maximum temperature is 150 degrees F. At block 1785, a pause is incurred. At block 1760, a determination is made check whether the temperature of the package is below a maximum temperature level. If it is determined, at block 1760, that the temperature of the package is below the maximum temperature level, then, in block 1765, the package lock is deactivated. At block 1770, a completion signal is provided. In the heating apparatus embodiment illustrated in FIGS. 38 and 39, if infrared thermometer 3813 detects that package 3601 is above a maximum of 150 degrees F., then a delay is repeatedly signaled and the cycle is paused until such time as the temperature of package 3601 falls below 150 degrees F. At that time, latch 3806 is disengaged and display 105 indicates that the heating cycle is completed.

There are benefits that stem from using plastic (or glass or paperboard) for all or part of the container that is subjected to inductive heating, e.g., as opposed to metal can containers. Hot steel cans are prone to burning a consumer's lips and fingers. In contrast, the lower thermal conductivity of plastic makes plastic a much more comfortable surface for drinking and holding. Note that in some cases, steel cans are fitted with insulating sleeves and/or insulated tops to mitigate the harshness of hot metal. The presently-disclosed package and heating apparatus embodiments reduce or eliminates the need for these packaging components and the associated costs, environmental impact, etc.

Unlike tin cans, the presently-disclosed package having a plastic body is easily re-closable, e.g., using a variety of industry-standard closures (e.g., threaded caps). Since plastic is a better insulator than tinplate, beverages within a plastic body stay hot longer as compared to beverages within an un-insulated steel can.

The presently-disclosed containers are adaptable to a variety of complex shapes (e.g., hourglass curves and conical sections). Thus the presently-disclosed containers may feature a variety of functional elements (e.g. contours to fit the human hand and cupholders) as well as trademark/branding and marketing elements (e.g., COCA-COLA's signature bottle). Steel cans, in comparison, are relatively limited in their potential shapes (i.e., variants of cylinders).

Temperature sensors work better with the presently-disclosed container embodiments than with tin cans. Infrared temperature probes tend to register inaccurate readings on tinplate, and thermocouple probes are rendered ineffective by the oscillating electromagnetic field of an RF induction cooker. So accurately measuring the temperature of a tin can during an induction heating process is problematic. In some embodiments, the presently-disclosed container may be provided with plastic (non-inductive) surfaces where the temperature of container can be readily measured using standard temperature probes (both thermocouple and IR).

In most current induction heaters, temperature probes generally measure the external temperature of the container body, where such container body is being directly heated. Such a measured temperature may not be representative of the temperature of the contents of the container. If the container being heated is a tin can, then the induction heater is directly heating the can, and during the heating cycle the temperature of the can will by definition be hotter (often much hotter) than the temperature of the can's contents. Thus even if temperature is measurable during the induction process, the temperature reading may not be particularly meaningful to control of the heater.

In contrast, the presently-disclosed container embodiments may provide plastic surfaces that are only indirectly heated by the induction heating apparatus; the heating apparatus warms the inductively heatable element, the inductively heatable element warms the beverage, and the beverage warms the plastic container. Thus the external temperature accurately reflects the actual temperature of the container contents, and themo-probes may be used very effectively.

During the heating cycle, the exterior of the preferred embodiment would stay much cooler than the exterior of a tin can undergoing induction heating. When inductively heating a tin can, the wall of the tin can is being heated directly. One side of the can wall is touching the liquid inside the can, and the other side of the can is exposed to the exterior of the can. As noted above, aggressive heating of a tin can often results in external temperatures near or exceeding 212 F. And these high temperatures can be injurious to the heater or the consumer. In contrast, when inductively heating, exterior temperatures will only approach the final heated temperature of the beverage (e.g., 140 to 150 degrees F.). This lower temperature has a significant effect on the operation and safety of the heater in actual use.

Common tin cans of foodstuff may be inductively heated. In doing so, the can body is heated which thence warms the contents of the can via the interior surface of the can; the exterior of the can does not contact the can's contents. In contrast, the presently-disclosed inductively heatable element is completely immersed in the beverage to be warmed. Thus, when the inductively heatable element is warmed by induction, both sides of the sheet metal serve to heat the foodstuff. This improves the efficiency of the heating; providing a greater amount of heating area for a given amount of sheet metal.

Figure 36:
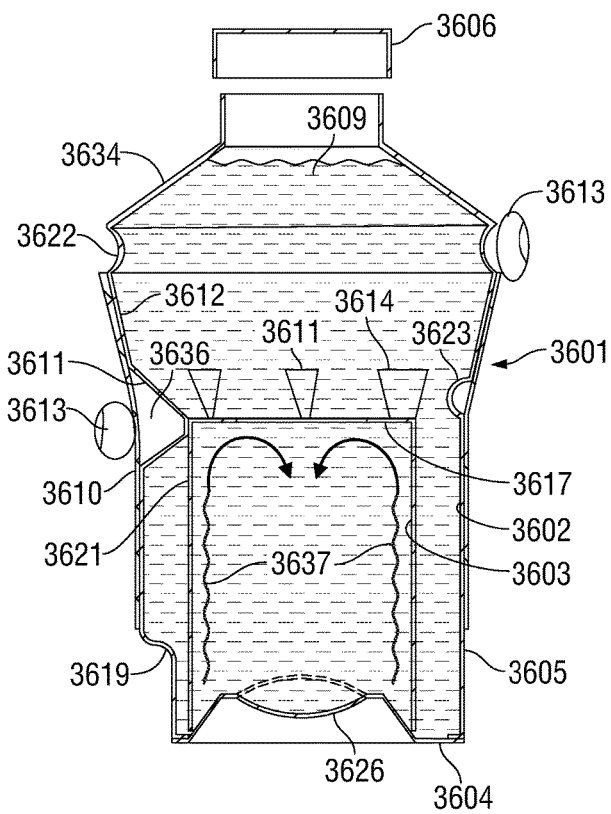
FIG. 36 is a cross-sectional view of a package in accordance with an embodiment of the present disclosure.
Figure 37:
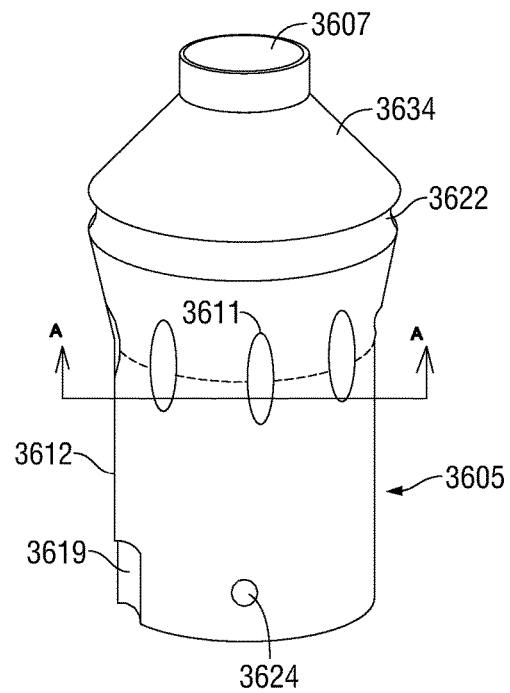
FIG. 37 is a perspective view of the package of FIG. 36 in accordance with an embodiment of the present disclosure.

FIG. 36 shows a package 3601 configured to contain a consumable product 3609, e.g., a fluid. Package 3601 includes a body 3602 and a cap 3606. Body 3602 may be formed from any suitable material, e.g., plastic. In some embodiments, as shown for example in FIGS. 36-39, body 3602 generally resembles a conventional plastic beverage container or bottle with its bottom removed. Body 3602 is configured to receive a generally tubular inductively heatable element 3603 within body 3602. Tubular inductively heatable element 3603 may be made of any material with suitable magnetic permeability characteristics, e.g., a ferritic metal. Tubular inductively heatable element 3603 may be made of any suitable material with appropriate rigidity or stiffness properties. Package 3601 includes base 3604, which is configured to securely attach to body 3602 to close its bottom. Body 3602 and base 3604 may be joined together to form a bottle 3605 which contains inductively heatable element 3603 inside of it. Cap 3606 is configured to be coupleable, e.g., threadedly coupleable, onto bottle mouth 3607. Cap 3606 may be produced by injection-molding from a suitable plastic material. When joined together, bottle 3605 and cap 3606 form a hermetically-sealed container in which consumable product 3609 is contained. Cap 3606 may include indicia (e.g., indicia 3816 shown in FIGS. 38 and 49), which may be a vertical dark line printed on cap 3606. In an embodiment, indicia 3816 is positioned directly above barcode 3825 when the cap 3606 is seated on bottle 3605 to form a hermetic seal.

A shrinkable sleeve 3610 may be placed around a region of the bottle 3605, and may include packaging graphics, a barcode, nutritional information, and/or other information.

A series of indentations 3611 are formed in sidewall 3612 of body 3602 in a generally radial pattern. Indentations 3611 may synergistically perform several functions. Indentations 3611 are configured to hold inductively heatable element 3603 in place within bottle 3605, e.g., mechanical friction and/or bonding (e.g., chemical bonding) between indentations 3611 and inductively heatable element 3603 may be used. Indentations 3611 reinforce sidewall 3612 by bridging sidewall 3612 to inductively heatable element 3603. Inductively heatable element 3603 is rigid and tubular, and relatively strong compared to the sidewall 3612 (e.g., the thin packaging plastic) of bottle 3605. When a consumer grips sidewall 3612, the force of the grip is transferred from sidewall 3612 to inductively heatable element 3603 by indentations 3611. Thus the inward force of a consumer's grip is transferred from sidewall 3612 to indentations 3611 and may help to prevent sidewall 3612 from buckling when bottle 3605 is gripped by a consumer's fingers. If not sufficiently rigid, a hot beverage container may collapse when gripped hard, and this buckling may cause hot fluid to spill out onto a consumer, which may cause burns. In general, it is desirable to use the least amount of plastic as possible when making a package, e.g., in order to minimize refuse and keep costs down. The extra support provided by indentations 3611 working together with inductively heatable element 3603 permits the use of thinner material (e.g., plastic) than might otherwise be needed. Thus, the operation of indentations 3611 to reinforce sidewall 3612 may improve consumer safety, reduce costs, and/or minimize waste.

Indentations 3611 are configured to make package 3601 easier to hold, e.g., indentations 3611 create ridges and voids on an otherwise smooth sidewall 3612, allowing a consumer to gain a better grip on package 3601. Also, the presence of ridges and voids reduces the contact area of a consumer's fingers. When gripping package 3601, portions of a consumer's fingers will span the space created by indentations 3611. Since heat transfer is related to surface area, indentations 3611 will reduce the heat that is transferred to a consumer's fingers, making the hot container feel more comfortable, and reducing the chance of burns.

The use of indentations creates a means by which the temperature of inductively heatable element 3603 can be measured during an induction heating process. In an embodiment, a specific indentation 3614 is located adjacent to barcode 3825, and the portion of shrinkable sleeve 3610 that would otherwise cover specific indentation 3814 is removed. Specific indentation 3814 provides a contact area 3817 where specific indentation 3814 abuts inductively heatable element 3603. This geometry allows the temperature of inductively heatable element 3603 to be inferred from the outside of package 3601 by directing an infrared thermometer at contact area 3817.

Various embodiments of the present disclosure provide a system configured to quickly, precisely, and/or continuously measure the temperature of a consumable product 3609 during an induction heating process. Embodiments of the presently-disclosed package provide a rigid container which is configured to be comfortably handled by a consumer. In some embodiments, one or more surfaces have low thermal mass, which allows the temperature of the consumable product 3609 contained within the package to be readily measured at the surface of bottle 3605 using an infrared thermometer. In some embodiments, a tubular inductively heatable element 3603 is provided and includes a large surface area for rapid heating of the consumable product 3609 without scalding. Inductively heatable element 3603 may be disposed in a vertical configuration, which enhances the heat transfer from inductively heatable element 3603 to consumable product 3609. Heating apparatus 3800 may be provided and configured to cooperate with package 3601 to achieve superior heating results. Such cooperation may include: precise positioning of package 3601 within heating apparatus 3800; the use of an infrared thermometer to measure temperature at multiple specific areas; and the use of advanced control logic to interpret temperature readings taken by the infrared thermometer.

The benefits of indentations 3611 are augmented by shrinkable sleeve 3610. Shrinkable sleeve 3610 reduces in diameter when heated, creating compressive force, which holds bottle 3605 and inductively heatable element 3603 together and further increases the rigidity of package 3601. Further, shrinkable sleeve 3610 covers indentations 3611, creating a series of air pockets 3636, which have an insulating property. Thus shrinkable sleeve 3610 may serve as a label for graphics and information and cooperates with indentations 3611 to enhance the structural integrity and safety and/or comfort to the consumer of package 3601.

Bottle 3605 includes a disc-shaped pressure bubble 3623 formed in sidewall 3612. Pressure bubble 3623 is biased inward (concave) and remains in this position while package 3601 is being stored and during normal heating operation. However, if the pressure within bottle exceeds a predetermined level (e.g., 2 psi), then pressure bubble 3623 will invert into a convex position, creating a protrusion on the side of bottle 3605. Such a protrusion may be operative to trigger a switch, may be optically recognized, or may otherwise be detectable by the heating apparatus. Thus the control system of the heating apparatus may utilize pressure bubble 3623 to detect if bottle 3605 is in an over-pressure state, and take appropriate action (e.g., end a heating cycle and latch bottle 3605 in place) to ensure the safety of the consumer. Bottle 3605 also includes a burst point 3624, formed as a weakened point in sidewall 3612. Burst point 3624 is operative to rupture at a specified pressure (e.g., 5 psi) to relieve an extreme overpressure situation within bottle 3605, while the other components of the package 3601 would not burst until a higher pressure (e.g., 10 psi). Burst point 3624 is located on bottle 3605 in a position where it's bursting would create reduced danger to the consumer.

Bottle 3605 includes a groove 3622 formed in sidewall 3612. Groove 3622 serves as an area wherein a latch may be placed that secures package 3601 to a heating apparatus, while the heating apparatus is in operation. Groove 3622 may also function to strengthen sidewall 3612 and to provide a surface which is relatively cool for fingers 3613 to touch, and easier for fingers 3613 to grip.

Inductively heatable element 3603 is generally tubular in shape and includes an annular section 3617. Said another way, it resembles a deep cup with a portion of the cup's bottom removed. This "modified cup" is disposed upside-down in bottle 3605. The presently-disclosed "hole in the bottom of an upside-down cup" design has unexpected benefits. Initially, this configuration was attempted to enhance the ability of a consumer to remove inductively heatable element 3603 from a wide-mouthed bottle (i.e., by creating a grip-able finger hole). However, it was found that this configuration of a heating element improves heat distribution within the bottle. In running tests using a vertically disposed, tubular heating element, it often occurs that a steep temperature gradient develops within vessel being heated. Hot water has lower density than cold water and rises to the top. In lab tests, annular section 3617 appears to disrupt this flow, keeping hot water in the bottom of the bottle and mitigating the temperature gradient. More specifically, it appears that when inductively heatable element 3603 is heated, convective currents of hot water 3637 flow from the bottom of inductively heatable element 3603 toward the top. Annular section 3617 disrupts this upward flow, somewhat trapping hot water on the inside of inductively heatable element 3603, and inhibiting the flow of hot water 3637 into the top of bottle 3605. Thus, this design of an inductively heatable element is useful even for embodiments where a finger-hole isn't needed. In this embodiment, it is expected that inductively heatable element 3603 may be removable by a machine for recycling rather than a consumer.

Inductively heatable element 3603 is plain-walled, with no perforations or small holes. Lab tests indicate that a plain surface on a heating element is more beneficial than a perforated one for absorbing energy and transferring heat; particularly at high wattage levels. A thin inductively heatable element with a plain surface offers more surface area than an inductively heatable element which is perforated (e.g., the loss of surface area from the material removed is greater than the surface area gained by new edges within the perforations). This greater surface area lowers the wattage per area of inductively heatable element 3603 for a given power setting and lowers the operating temperature of inductively heatable element 3603, which may reduce scalding of consumable product 3609. Heat transfer is enhanced by the vertical disposition of inductively heatable element 3603 within the bottle 3605, which tends to create convective flow due to vertical temperature gradients.

Base 3604 of package 3601 is generally cylindrical and sized to fit inside a common automotive cup holder. A notch 3619 is present in base 3604. As further described below, notch 3619 is operative to align package within a heating apparatus in a particular way and to prevent certain inappropriate objects from being placed in the heating apparatus. Note that a single notch is being illustrated here for simplicity. There are many alternate variations which function comparatively. For example, instead of being cylindrical, base 3604 could be shaped as a polygon with one side longer than the others (e.g., a right triangle). Alternatively, it could be made with multiple notches, or a tapering notch that guides the bottle into the heating apparatus.

Figure 44:
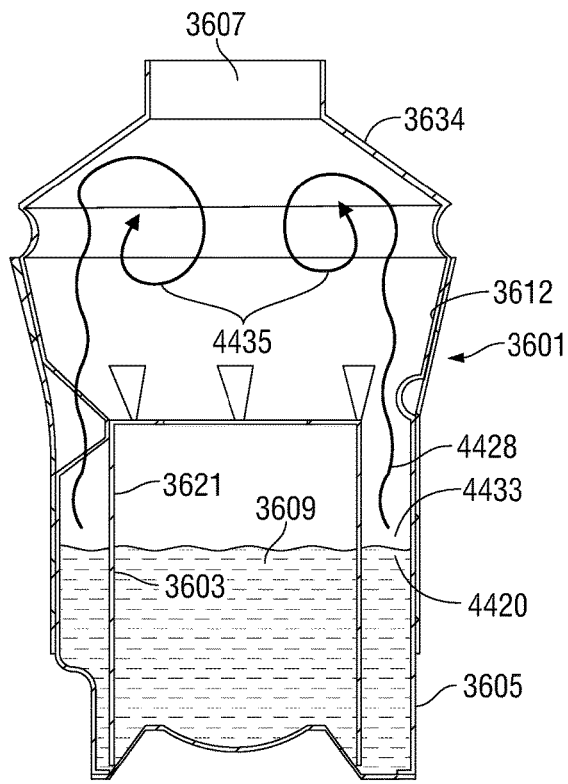
FIG. 44 is cross-sectional view of a package and an inductively heatable element in accordance with another embodiment of the present disclosure.

One potentially dangerous scenario for consumers involves a partially-filled container. An example of this is illustrated in FIG. 44, where bottle 3605 is approximately one-third filled with consumable product 3609 and the inductively heatable element 3603 is only half-submerged, with liquid extending to waterline 4420. In this situation, if an inductive heating coil is activated, inductively heatable element 3603 will heat rapidly. The portion of inductively heatable element 3603 that is below waterline 4420 will heat as usual and will remain at normal operating temperatures. However, the upper portion 3621 of inductively heatable element 3603 that is above waterline 4420 is not in direct contact with consumable product 3609. Consequently, the upper portion 3621 of inductively heatable element 3603 will rise in temperature quickly, producing exceptionally high temperatures within inductively heatable element 3603, which may vaporize the coatings on inductively heatable element 3603 and potentially even melt the metal. Further, in lab tests, it can be observed that the portion of inductively heatable element 3603 that is immediately adjacent to waterline 4420 is particularly hot and tends to flash consumable product 3609 at waterline 4420 into steam. Thus a consumer may be faced with chemical vapor, flashing steam, and an unexpectedly hot container.

One approach to overcoming the problems associated with heating a partially-filled container is to provide a weight sensor, e.g., a load cell, for use to detect if a container is within a certain weight range. Under this approach, if the sensed weight is not within an appropriate range, then the container is "rejected" and/or the heating apparatus is precluded from operating. Such an approach does not create an effective mechanism for heating a partially-filled container; it only "rejects" partial fills. This is a shortcoming, since many consumers sip a beverage over time and wish to re-heat the beverage as the container is emptied. In general, weight sensors are prone to a variety of errors. Load sensors, for example are very dependent on a proper tare cycle to yield an accurate weight measurement. Further, weight sensors are generally susceptible to breakage and may be inadvertently spoofed by a consumer. For example, a consumer might lean an object (e.g., book or other item) against the device, or the container may become wedged in the heating apparatus. In such cases, the weight sensor may register a falsely high weight and permit the heating apparatus to activate with a partially-filled container inside of it, creating the dangerous situation described above.

In some embodiments, a weight sensor may be used as a means of dealing with a partially-filled container. Additional, alternative and/or redundant means for detecting partially-filled containers may be provided. This increases the safety of the presently-disclosed heating apparatus over the prior art. In addition, the enhanced ability to detect a partially-filled container enables the presently-disclosed heating apparatus to provide consumers with the additional benefit of heating partially-filled containers.

As described above, if a partially-filled bottle 3605 is subjected to induction heating, upper portion 3621 of inductively heatable element 3603 rises in temperature rapidly. As described above, embodiments of the presently-disclosed system are configured to measure the temperature of upper portion 3621 by using an infrared thermometer in combination with specific indentation 3814. Based upon the temperature measurements, the control system can detect a problem occurring and adjust operation accordingly.

As described above, embodiments of the presently-disclosed heating apparatus provide a means of quickly and effectively measuring the temperature of bottle 3605 above inductively heatable element 3603. Laboratory tests have shown that, when a partially-filled package 3601 is subjected to induction heating, such partially-filled package 3601 produces a distinct pattern of temperature readings. This pattern or "temperature profile" is dependent on a variety of factors, including: the level of fill within the package 3601, the specific geometry of the package 3601, the specific consumable product 3609 (e.g., coffee versus soup), and the amount of power applied to inductively heatable element 3603.

As further described below, the control system compares the actual temperature profile experienced in an induction heating cycle with the temperature profile expected. And, if the profile is sufficiently different from what was expected, the system's controller will take appropriate action. Further, the control system may use the temperature profile as a logic element to characterize and adapt the control cycle of the heating apparatus. In some situations, the temperature profile will indicate a specific error state (e.g., empty container or broken heating apparatus component) and communicate such error states to the consumer or manufacturer.

Figure 45:
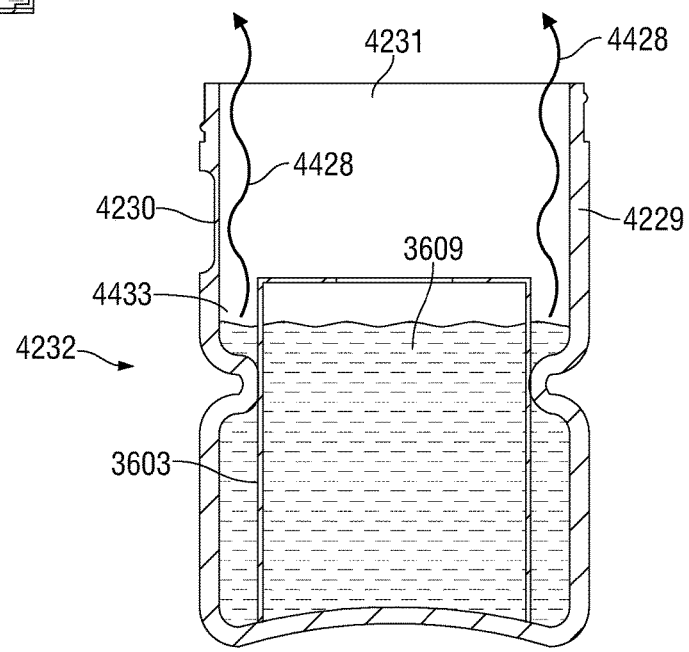
FIG. 45 is cross-sectional view of a bottle and an inductively heatable element in accordance with another embodiment of the present disclosure.

The current embodiment includes a narrow mouth 3607. In particular, mouth 3607 of bottle 3605 has a diameter that is notably smaller than the diameter of inductively heatable element 3603. This narrow mouth 3607 may have a number of advantages. FIG. 45 is a sectional view of a glass bottle 4232 with a wide mouth 4231. Glass bottle 4232 is approximately one-half filled with consumable product 3609. When inductively heatable element 3603 is subjected to induction heating along its full length, consumable product 3609 flashes to vapor 4428 at the point where waterline 4420 meets inductively heatable element 3603. Such vaporization will tend to be most violent at flash area 4433 adjacent to thick wall 4229, where a relatively small amount of water is trapped between inductively heatable element 3603 and thick wall 4229. This vapor 4428 travels up through glass bottle 4232, along thick wall 4229, and out of wide mouth 4231. In doing so, vapor 4428 flows over thinned area 4230 and heats thinned area 4230 in a distinctive manner. The resultant temperature increase is measured by infrared thermometer 3813 and transmitted to controller 3911.

A similar situation may occur in the case where the container has a narrow mouth instead of a wide mouth, as shown for example in FIG. 44. As described above, consumable product 3609 flashes to vapor and proceeds along sidewall 3612. However in this situation, the narrowing neck 3634 of bottle 3605 diverts vapor from its vertical path, creating vapor eddies 4435 and inhibiting the exit of vapor 4428 through mouth 3607. In this situation, the thin sidewall 3612 upon which a temperature measurement is taken heats up quickly due to eddies 4435 and trapped vapor 4428. Thus the use of a narrow mouth 3607 increases the rate at which the temperature at sidewall 3612 rises and may be detected, enhancing the system's ability to detect a partially-filled container or other dangerous condition.

FIG. 38 is a perspective view of package 3601 as it is inserted into heating apparatus 3800. In use, heating apparatus 3800 is placed on a counter, desk or other surface and plug 102 is inserted into a household electrical outlet. On the surface of heating apparatus 3800 one can see the mouth of cradle 3803, latch 3806, button switch 3807, infrared thermometer 3813, and barcode reader 3815. Package 3601 is inserted into cradle 3803 of heating apparatus 3800 and switch 104 is pressed to initiate a heating cycle. A display 105 may present information to the consumer, such as instructions, status of the heating process, or errors in the use of device.

Figure 41:
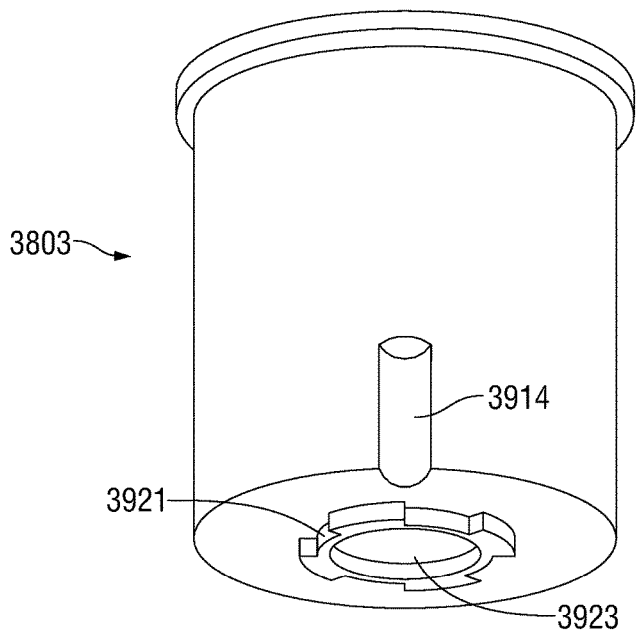
FIG. 41 is perspective view of the package of FIG. 40 in accordance with an embodiment of the present disclosure.

FIG. 39 is a cross-sectional view of the heating apparatus 3800 and package 3601 shown in FIG. 38. FIG. 41 is a perspective view of cradle 3803. Heating apparatus 3800 includes a housing 3812 which encloses the internal components of heating apparatus 3800. A generally cup-shaped cradle 3803 is substantially located inside of heating apparatus 3800. Cradle 3803 includes a protrusion 3914, which is shaped to conform with notch 3619. When package 3601 is properly placed in cradle 3803, protrusion 3914 aligns with notch 3619. When package 3601 is so positioned: infrared thermometer 3813 is located adjacent to the horizontal plane on which indentations 3611 lay; barcode reader 3815 is aligned with the horizontal plane on which barcode 3825 (FIG. 38) lays; button switch 3806 is aligned with the horizontal plane on which pressure bubble 3623 lays; and latch 3806 is aligned with groove 3622. Infrared thermometer 3813, barcode reader 3815, button switch 3807 and latch 3806 are communicatively coupled to controller 3911, e.g., via transmission lines 3929, 3928, 3930 and 3927, respectively. In some embodiments, if package 3601 is incorrectly positioned in cradle 3803 (i.e., notch 3619 does not align with protrusion 3914), protrusion 3914 will prevent package 3601 from being fully inserted in cradle 3803, and barcode 3825 (FIG. 38) will be unreadable by barcode reader 3815.

Heating apparatus 3800 includes a current generator 3916. Current generator 3916 may be any generator capable of producing the radio frequency alternating current necessary to induce heat in inductively heatable element 3603. Current generator 3916 is communicatively coupled to controller 3911 by transmission line 3931. Controller 3911 may be configured to adjust one or more operating parameters of the current generator 3916. Controller 3911 may be configured to switch the current generator 3916 between a plurality of operating modes. Heating apparatus 3800 includes an upper coil 3917 and a lower coil 3918. Both such coils may be made from litz wire suitable for induction heaters. An SPDT switch 3919 provides that when in a first position (position "A"), the current generator will provide current only to lower coil 3918. When SPDT switch 3919 is in a second position (position "B"), current generator 3916 will provide current to lower coil 3918 and upper coil 3917 in series. In other embodiments, a switch may place the two coils in parallel. Additionally, or alternatively, the two coils may be used as a single coil with a center tap. SPDT switch 3919 is communicatively connected to controller 3911 by transmission line 3936. Button 104 and display 105 are communicatively coupled to controller 3911 by transmission line 3935 and transmission line 3934, respectively.

Cradle 3803 is located within heating apparatus 3800 such that it rests on bearing 3925, and cradle 3803 may rotate axially within heating apparatus 3800. Motor 3920 engages gear 3921 on cradle 3803 and is operative to rotate cradle 3803 when caused to do so by controller 3911. Motor 3920 is communicatively coupled to controller 3911 by transmission line 3933. Thus package 3601 may spin within heating apparatus 3800 as determined by controller 3911. Further, since package 3601 is fixed in a specific position within cradle 3803 by notch 3619, controller 3911 may rotate package 3601 such that barcode 3825, indentations 3611 and pressure bubble 3623 are located in specific positions.

Heating apparatus 3800 includes a scale 3910, which is communicatively coupled to controller 3911 by transmission line 3937. Scale 3910 may be disposed within or otherwise associated with one of the feet of the heating apparatus 3800. Upon insertion of package 3601 into cradle 3803, the additional weight of package 3601 is registered by scale 3910. An infrared thermometer 3813 is located within housing 3812, adjacent to where indentations 3611 are located when package 3601 is correctly placed in cradle 3803. Infrared thermometer 3813 communicates with controller 3911.

Heating apparatus 3800 includes a lower thermometer 3922 which is communicatively coupled to controller 3911 by transmission line 3932. Lower thermometer 3922 is positioned adjacent to a bottom section 3923 formed in cradle 3803. When package 3601 is first opened by the consumer, vacuum is released from package 3601 and bottom wall 3626 flexes from a concave position to a convex position. In its convex position, bottom wall 3626 comes into contact with bottom section 3923. Thus if the package has been opened and the contents are being heated, lower thermometer 3922 will register a temperature increase as the contents of the package are heated, and these temperature readings may form an element of the control system. However, if the package has never been opened, then bottom section 3923 remains in a concave position. In this position, any heating of the package contents will be slow to register on lower thermometer due to the air gap between bottom section 3923 and bottom wall 3626. Thus, if the controller activates the heating apparatus and there is only a slow temperature increase, or no increase in temperature, registered by lower thermometer 3922, the controller may be configured to infer that the package has never been opened and use that piece of information to adapt the control cycle and/or signal the consumer. Note that whether or not the package has been opened is an important indicator of certain dangerous scenarios. For example, if the bottle has never been opened and the scale registers a weight that is less than expected for a full bottle, then this would imply that either the bottle was under-filled or (more-likely) that the scale is not functioning correctly. Either of these situations is dangerous. Although heating apparatus 3800 includes a thermometer 3922 for use to ascertain whether the bottle has been opened, other devices may be used to sense whether the bottle has been opened. For example, a pressure switch may be used to detect whether bottom wall 3626 is flexed inward or outward.

Heating apparatus 3800 includes a line reader 3824 which is communicatively coupled to controller 3911 with transmission line 3926. Line reader 3824 is operative to sense whether a cap 3606 is present on bottle 3605 and, if cap 3606 is present, whether cap 3606 is fully closed to seal bottle 3605. Line reader 3824 is aimed at the area where cap 3606 would be on package 3601. If a black bar crosses the path of line reader 3824, it registers this fact and transmits such information to controller 3911. In some embodiments, the line reader is essentially a barcode scanner that simply measures the occurrence of a bar rather than a pattern of bars. In operation, package 3601 is rotated by the heating apparatus while line reader 3824 is functioning. If a bar is sensed at the position where it reflects a closed bottle (e.g., directly above the barcode), then controller 3911 may deduce that the bottle is sealed closed. If a bar is detected in another location, controller 3911 knows that the bottle cap is not fully sealed and may permit some pressure to escape. Controller 3911 may be configured to deduce that the cap is removed if a bar is not detected.

The presence and position of a cap is a significant safety and control factor, particularly for partially-filled containers. In a full container, there is generally a small amount of gas located in the headspace of the container. When the full container is heated, the gas in the headspace expands according to gas laws (e.g., going from 23 degrees C. to 53 degrees C. causes an approximate 10% increase in gas pressure and/or volume). For the small amount of gas in a full container, this is not a big problem; the container generally expands to accommodate increased volume, and the small amount of expanded gas escapes harmlessly when the container is opened. However, in a partially-filled container, there is substantial headspace filled with air. So if the cap is on and tight, then a re-heat cycle can produce substantial pressure within the container. And when a consumer opens the cap, there is a rush of hot air that can potentially burn the consumer. A container with a loose or no cap will allow expanding air to escape, avoiding the problem. Thus by detecting a tightly fitted cap, an additional safety feature is provided that enables a heating apparatus embodiment to safely re-heat containers which have a hermetic seal.

Referring again to FIGS. 38-40, to use the package and heating apparatus, a consumer inserts package 3601 into cradle 3803 of heating apparatus 3800. The consumer then presses (or otherwise activates) switch 104 to activate heating apparatus 3800.

Button 104 communicates with controller 3911 to signal the consumers wish to begin. Controller 3911 then proceeds to check various sensor inputs. Controller 3911 scans the barcode. To do so, controller causes bottle 3601 to rotate such that the barcode sweeps across the barcode reader and processes the signal resulting from the sweep. In an embodiment, controller 3911 is configured to take four temperature measurements: controller 3911 causes package 3601 to rotate such that infrared thermometer 3813 is adjacent to uninsulated section 4027 and measures the temperature at this point which represents the temperature of consumable product 3609; controller 3911 causes package 3601 to rotate such that infrared thermometer is adjacent to specific indentation 3614 and measures the temperature at contact area 3817, which represents the temperature of inductively heatable element 3603; controller 3911 causes package 3601 to rotate such that infrared thermometer 3813 is adjacent to an indentation 3611 and measures the temperature at this point which represents the temperature of the insulated package exterior; and controller 3911 reads the temperature from lower thermometer 3922. Controller 3911 receives a measurement of the weight of package 3601 from scale 3910. Controller 3911 causes package 3601 to rotate such that line reader 3824 establishes whether cap 3606 is present, and, if so, if cap 3606 is tightly sealed. Although barcode readers that sweep a light across a fixed barcode using oscillating mirrors may be used, such oscillating mirrors are costly and somewhat fragile. So the rotating cradle may help reduce costs and increase the durability of the heating apparatus.

Based on the specific information collected, controller 3911 determines if it appropriate to initiate a heating cycle, and, if so, what the appropriate heating cycle involves (e.g., power setting(s), motor controls, which coil(s) to use and the sequence of measurements to take over time). If starting conditions are not met, and it is not appropriate to initiate a heating cycle, then controller 3911 indicates to the consumer the status of the situation and the appropriate actions that should be taken (e.g., "remove and reinsert bottle", or "bottle is not full enough, please insert a different one"). Such signal may be communicated to the consumer through display 105 and may additionally or alternatively be communicated through tones or spoken voice or another means.

If starting conditions are met, controller 3911 causes latch 3806 to engage. securing bottle 3605 to heating apparatus 3800 along groove 3622. Controller 3611 then proceeds to execute the determined heating cycle. During the heating cycle, latch 3806 is engaged in groove 3622, locking bottle 3605 to heating apparatus 3800 unless and until the bottle may be safely removed. When bottle 3605 may be safely removed, controller 3911 releases latch 3806. In an alternative configuration, latch 3806 may remain in a retracted position during normal operation and only engaged in groove 3622 if a situation develops wherein the retention of package 3601 within heating apparatus 3800 is beneficial, e.g., if the temperature of consumable product 3609 is above a desired temperature.

Upon initiation of a heating cycle, controller 3911 causes current to flow through upper coil 3917 and/or lower coil 3918. This current induces electrical current eddies and hysteresis within inductively heatable element 3603, which cause inductively heatable element 3603 to increase in temperature on a position adjacent to the coil(s) which was activated (i.e., top, bottom or both). Since inductively heatable element 3603 is immersed in consumable product 3609, the increasing temperature of inductively heatable element 3603 warms consumable product 3609.

During the heating cycle, controller 3911 repeatedly checks sensor inputs. In doing so, controller 3911 causes motor 3920 to rotate cradle 3803 back and forth. Cradle 3803, is engaged to bottle 3605 via notch 3619 and protrusion 3914. So the rotation of cradle 3803 translates to bottle 3605, and positions infrared thermometer 3813 adjacent to various locations to take repeated temperature readings. In doing so, the rotation agitates bottle 3605, which aids in mixing consumable product 3609 to achieve a more uniform temperature distribution of consumable product 3609 within bottle 3605. If pressure bubble 3923 inverts due overpressure within package 3601, then the rotating bottle will cause a convex pressure bubble 3923 to trigger button switch 3807 and signal controller 3911 to take correct action. Thus the oscillation of cradle 3803 achieves multiple purposes.

Controller 3911 continues to execute the determined heating cycle, until either: the proscribed ending conditions are met and consumable product 3609 is heated to the correct temperature; or a fault or error occurs and the cycle is not proceeding as expected. During the heating cycle, controller continuously indicates the status of the cycle to the consumer on the display. For example, the display may show the time elapsed and the current temperature of bottle 3605. If appropriate ending conditions are met, then controller 3911 deactivates coil(s), disengages latch 3806 and signals the consumer that the cycle is complete.

If the process is not proceeding as expected, then controller 3911 uses the sensor readings obtained since the process began to identify a scenario associated with the pattern of sensor readings. For example, if the sensor readings may indicate that the bottle is only partially (e.g., 75%) full. In this case, controller 3911 may determine that a revised cycle is possible, indicate such to the consumer, and proceed with a revised heating protocol (e.g., a protocol using a lower power setting and different coil configuration). Alternatively, if the controller determines from the sensory data that a revised cycle is not possible (e.g., if the container is only 10% full), then the controller proceeds with an alternate course of action. This alternate course of action involves deactivating the coil then signaling the status and actions required to the consumer (e.g., "Bottle empty, please wait until green light flashes, then remove and discard bottle"). Finally, controller 3911 disengages latch 3806 at a time when it is safe to do so.

FIG. 49 shows a perspective view of an alternate embodiment of heating apparatus 3800. In this embodiment, heating apparatus 3800 includes a camera 4908. Camera 4908 is functional to read barcode 3825, establish the position of bar 3816 and determine whether pressure bubble 3623 has flipped to a convex position. Thus camera 4908 serves in place of several components of the current embodiment. In this embodiment, latch 4906 is moved to an alternate position on heating apparatus 3800 in order to provide camera 4908 with clear lines of sight to the various features of package 3601. Camera 4908 may also be operative to detect waterline 4420 of a given package 3601. Specifically, such waterline 4420 may be visible through a translucent package, and camera 4908 may measure and transfer this information to controller 3911 to determine the fill level of package 3601 and incorporate this information into a control cycle.

Figure 42:
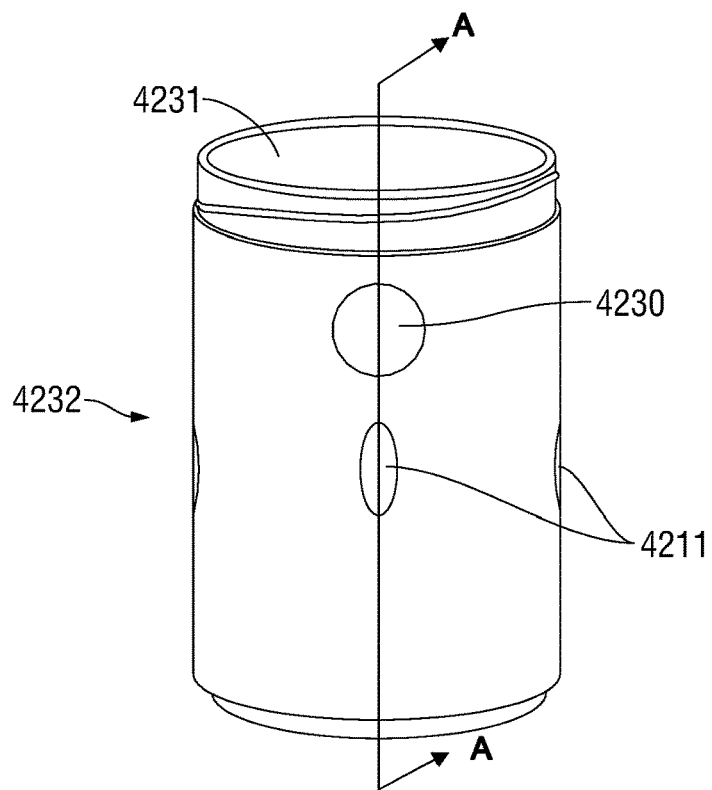
FIG. 42 is perspective view of a package in accordance with another embodiment of the present disclosure.
Figure 43:
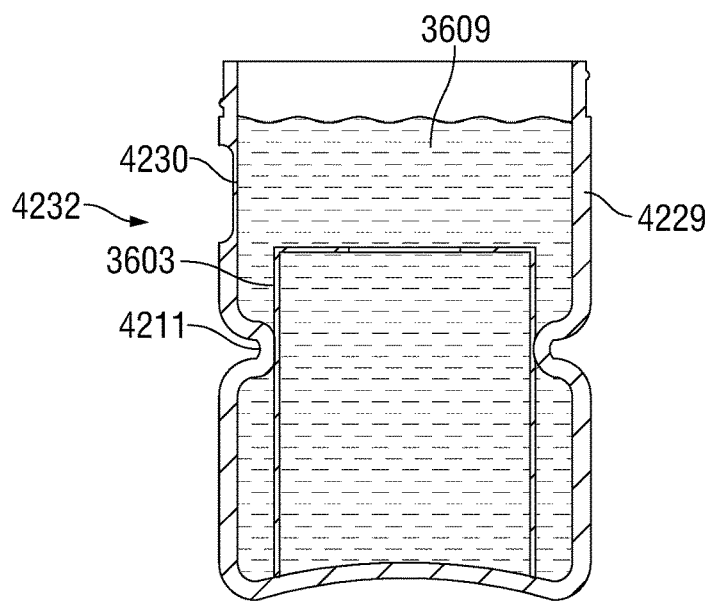
FIG. 43 is a cross-sectional view of the package of FIG. 42 in accordance with an embodiment of the present disclosure.

FIG. 42 shows a perspective view of an alternative embodiment which resembles a glass jar. FIG. 43 is a sectional view of this embodiment taken along A-A of FIG. 42.

In this embodiment, glass bottle 4232 serves as a container for a consumable product 3609. Glass bottle is generally comprised of a thick wall 4229, which serves to provide strength and rigidity. The thickness of the wall also provides thermal insulation. Such thermal insulation is advantageous for protecting a consumer's fingers from burning and maintaining the warmth of the beverage. However, the insulated surface is problematic for temperature measurement. When consumable product 3609 is being inductively heated using inductively heatable element 3603, the temperature of both consumable product 3609 and thick wall 4229 both increase. However, the insulative property of thick wall 4229 is such that the external temperature of thick wall 4229 climbs more slowly than the temperature of consumable product 3609. The resultant time lag makes temperature control difficult for such a container. This is particularly the case for high-wattage and high temperature heating, when such time lag may be considerable and the need for effective temperature control is high.

In the current embodiment, glass bottle 4232 also features a thinned area 4230. This area is relatively small such that it does not compromise the strength of glass bottle 4232. When functioning with the heating apparatus of the current embodiment, thinned area 4230 is placed in alignment with an infrared thermometer. Thinned area 4230 is functional to provide an external surface that more closely approximates the internal temperature of consumable product 3609, than does the exterior of thick wall 4229. Thus the presence of both insulated and uninsulated surfaces on glass bottle 4232 provide for effective temperature measurement during an inductive heating process; comfortable surfaces for consumer handling; and the use of materials which are suitable for consumer packaged goods.

Various physical features of the presently-disclosed heating apparatus combine with a novel control protocol to improve the control of an induction powered heating apparatus of foodstuffs. The control system involves a protocol in which various data is obtained from sensor inputs by a controller unit prior to the initiation of a heating cycle. This data may include: specific information obtained from the barcode scan about the package and the product in the package, such as i.) the composition of the foodstuff contained in the container (e.g., coffee, soup or a milk-based beverage), ii.) the weight of the empty package, iii) the weight of the foodstuff contained in a full package, iv) the design and heat transfer characteristics of the container. This data may include: the starting temperature of various portions of the package; the weight of the package; the presence and position of a cap in place on the package; whether the package has ever been open since it was packaged; whether certain safety features of the package are intact (e.g., whether a pressure bubble is in place and in an expected position and whether the temperatures taken at various points on the package are consistent with normal conditions.

Based on the data gathered, the controller determines an appropriate control cycle for the foodstuff to be heated. The control cycle may include factors such as: the power setting to be used in the control cycle at various points in time and which coil geometry to use. The cycle might start with a low power setting to test the responsiveness of various sensors to the application of power to the system, then increase to a high power setting to perform a rapid heating of the package contents, and conclude with a moderate power setting to obtain more precise end-temperatures. The control cycle may include additional factors such as the sequence of rotational movements used spin or oscillate the cradle to obtain temperature readings, provide agitation of the package during heating, etc. The control cycle may determine upper and lower boundaries for temperatures that are to be measured at various times in the heating cycle. The control cycle may determine appropriate responses to changes that may occur in other measurement points of the system (e.g.,
the pressure bubble). The heating apparatus engages a latch to lock the package into the heating apparatus during the heating cycle. The heating cycle begins and the heating apparatus performs a repetitive cycle which includes: oscillation of the package to provide agitation and mixing of its contents; measurement of temperature at various places on the package; comparison of the measured temperature to the expected temperature; comparison of other measurement points of the system to what was expected (e.g., whether the pressure bubble has flipped, or the barcode is no longer visible).

If a measurement point deviates from what is expected, the heating apparatus will take appropriate action. For example, if the temperature measurement at any of the measurement locations exceeds an upper limit or falls below a lower limit, the control system may, depending on the specific fact pattern: i) abort the heating cycle and signal the consumer appropriate actions to take; or ii) recalculate a revised protocol and execute the new protocol. If the temperature or pressure within the container exceeds safe levels, the controller will signal the consumer and keep the latch in place, preventing the consumer from removing the container until conditions are safe. If a temperature measurement deviates from what is expected, but does not cross a threshold for disrupting the heating cycle, the controller may take several alternative actions, such as i) modifying the control cycle (e.g. lowering the power setting; or ii) re-measuring the temperature to ascertain whether the temperature measurement was an anomaly. If the heating cycle proceeded as expected, then the heating apparatus will signal the consumer that the cycle is completed and release the latch at an appropriate time. If the heating cycle did not proceed as expected (i.e., an abnormal cycle), then the controller compares the data obtained during the heating cycle to a set of known scenarios. The controller then signals the consumer what the error was and what to do about it. For example, if the temperature profiles obtained during the heating cycle indicate an empty container, then the consumer is told so on a screen. A wide variety of other messages may be communicated, including "remove bottle cap", "remove and reinsert bottle", etc. If the detected scenario merits it (e.g., if the heating apparatus has a faulty component), the controller may communicate this fact to the manufacturer in addition to the consumer. For example, the heating apparatus may use a wireless connection to transmit appropriate information to the manufacturer via the Internet.

Figure 46:
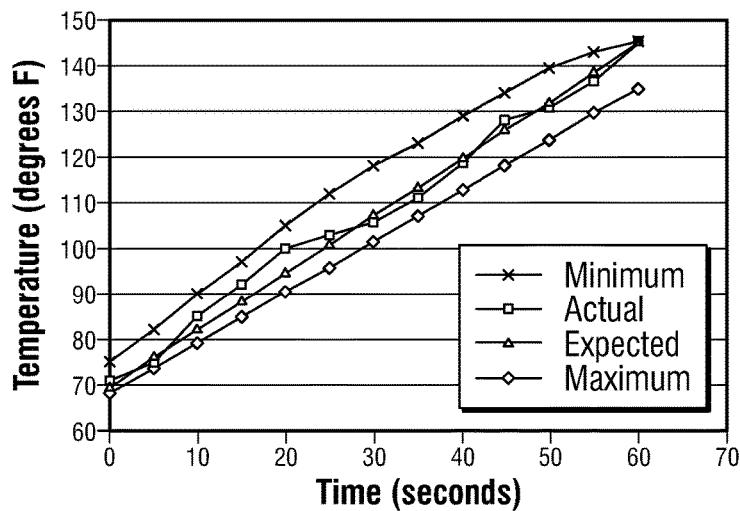
FIG. 46 is a graph in accordance with an embodiment of the present disclosure.

FIG. 46 shows a graph of temperature of the beverage in the container over time for a normal heating cycle. In the graph, you will see that there are lines which represent i) a determined maximum temperature allowed at various points in time; ii) a determined minimum temperature at various points in time; iii) an expected actual temperature at various points in time; and the actual temperature measured at various points in time. In this situation, the heating cycle has proceeded as expected. While the measured temperature has varied modestly from that which was expected, the temperature stayed within bounds and the heating cycle was completed normally.

Figure 47:
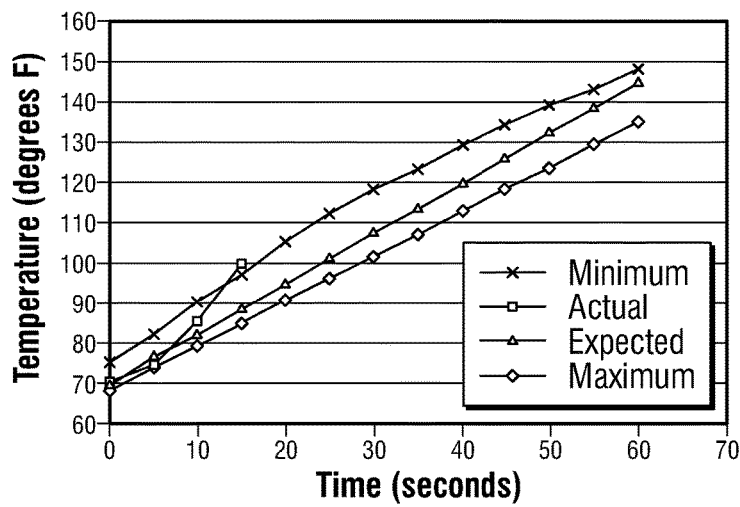
FIG. 47 is a graph in accordance with an embodiment of the present disclosure.

FIG. 47 shows a graph with similar temperature measurement lines. However, in this case, the measured temperature increased more rapidly than expected and crossed over the maximum temperature line approximately 15 seconds into the process, when the machine was disabled. This situation may occur for example in a partial fill situation where the temperature of the inductively heatable element is reaching exceptionally high levels and flashing container contents in vapor. The resulting steam abnormally heats the side wall, and the heating apparatus was quickly disabled. Note that if this scenario were experienced in a conventional control system seen in the prior art (i.e., a control system which had a single temperature end-point of 145 degrees F.), then the heating cycle would have continued substantially longer and created a hot steamy container that is a potential hazard to a consumer.

Figure 48:
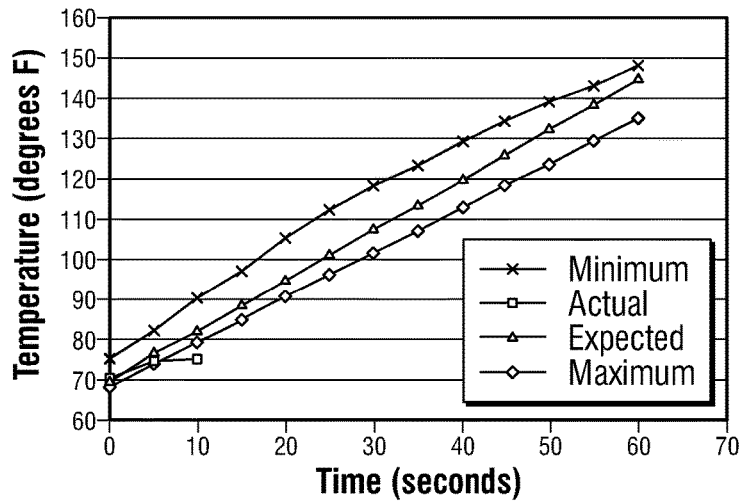
FIG. 48 is a graph in accordance with an embodiment of the present disclosure.

FIG. 48 also shows a graph with similar temperature measurement lines. In this case, the measured temperature is significantly lower than what was expected, and the heating apparatus was disabled after approximately 10 seconds. This situation may occur if the container is substantially empty of its contents. In that situation, there is insufficient liquid present to form vapor. So no vapor is formed and the temperature of the container's contents (i.e. air) rises only slowly. This situation can be dangerous in that the inductively heatable element, in the absence of any cooling fluid, can grow exceptionally hot, creating a dangerous situation. As with the last illustration, a conventional control system would not have responded quickly to deactivate the heating apparatus; the temperature in the container would not have hit the trigger point (e.g., 145 degrees F.) until much later in the cycle, after which a dangerous condition would exist. The presently-disclosed control system may serve as confirmation and back-up to the measurement illustrated herein. For example, in addition to measuring the surface temperature of the container, the temperature of the inductively heatable element may also be measured. And in this case the inductively heatable element temperature would be raised very rapidly, triggering deactivation of the heating apparatus.

Figure 18:
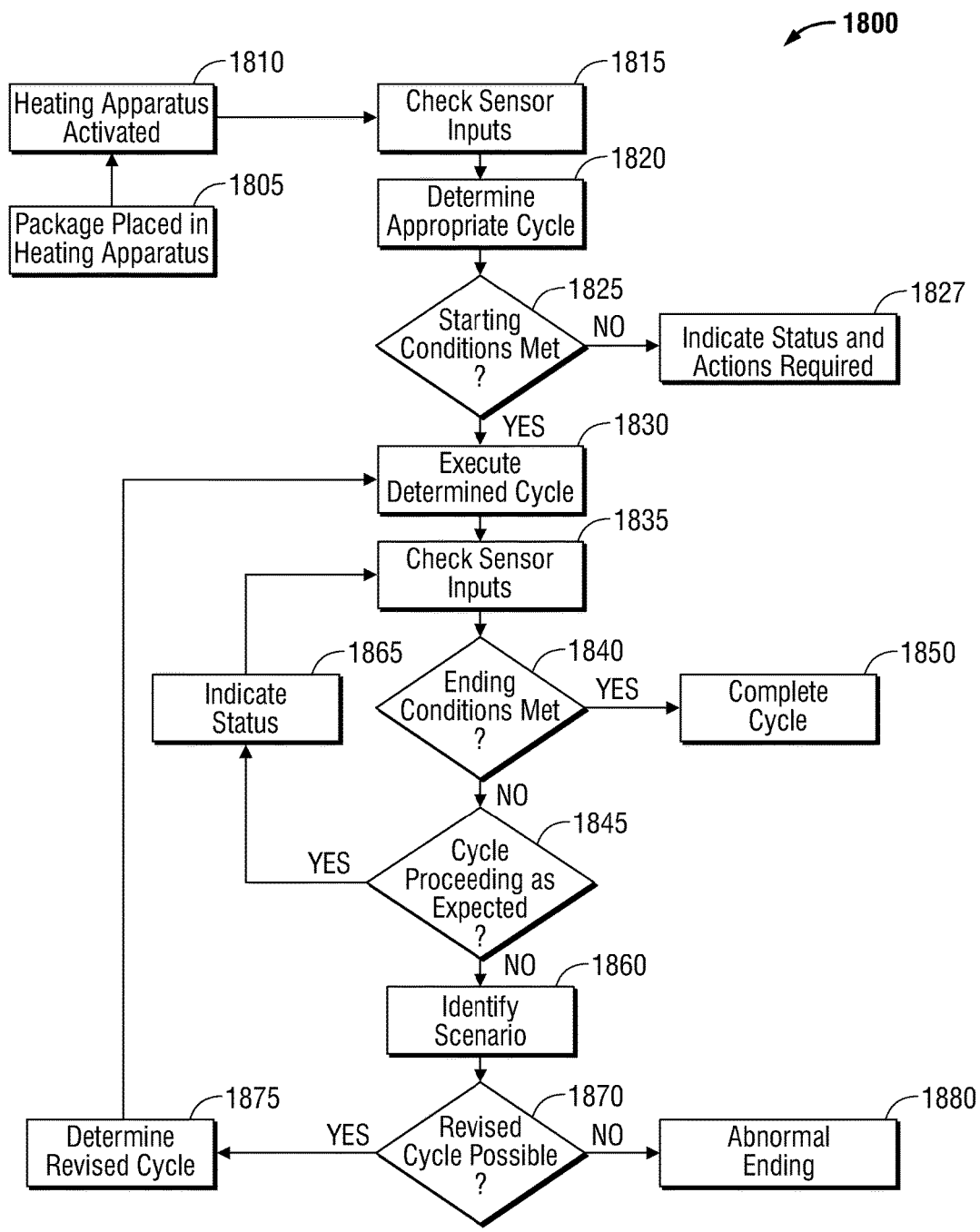
FIG. 18 shows a flowchart illustrating a process of heating a package in accordance with another embodiment of the present disclosure.

FIG. 18 shows a flowchart illustrating a process (shown generally as 1800) of heating a package in accordance with an embodiment of the present disclosure. In one embodiment, the process 1800 is executed by one or more sequence of instructions that causes various elements of a presently-disclosed heating apparatus embodiment to perform the described actions. In one non-limiting example described below, the process 1800 is applied using the heating apparatus 3800 shown in FIGS. 38 and 39.

At block 1805, a package (e.g., package 3601 shown in FIGS. 38 and 39) is placed in the heating apparatus 3800. The consumer inserts package 3601 in cradle 3803, and insertion of the package 3601 causes an increase in the weight measured by scale 3910. Controller 3911 registers this additional weight as the weight of package 3601.

At block 1810, the heating apparatus is activated. The consumer depresses (or otherwise activates) switch 104 to initiate a default heating cycle associated with package 3601, and switch 104 signals this intention to controller 3911. In another embodiment, there may be a plurality of different buttons that are associated with different instructions (e.g., one button may initiate a defrost cycle ending in a cold temperature, another button may initiate a rapid heating cycle ending in a hot temperature, and/or other buttons may indicate varied desired end-temperatures), and/or a user interface may be provided which may include a touchscreen and/or may be configured to receive voice commands.

At block 1815, one or more sensor inputs of the heating apparatus 3800 are checked. In the embodiment illustrated in FIGS. 38 and 39, barcode 3825 is scanned, temperature measurements are taken at various points of package 3600, indicia 3816 is read, and the position of pressure bubble 3623 is identified.

At block 1820, an appropriate cycle is determined. In the embodiment illustrated in FIGS. 38 and 39, the sensor data obtained at block 1815 (e.g., package contents, starting temperature and/or fill level) are used to establish a cycle. In some embodiments, a cycle may include power setting(s), motor controls, which coil(s) to use and the sequence of sensor measurements to take over time. To determine the cycle, the controller (e.g., controller 3911 shown in FIG. 39) may reference a database of potential package contents and starting sensor scenarios. Alternatively, or additionally, the controller 3911 may use a formula-driven algorithm to determine various elements of the appropriate cycle. In determining the appropriate cycle, the controller 3911 may determine that certain starting conditions are not met. For example, a package may be empty, too hot or inserted incorrectly into the heating apparatus.

At block 1825, a determination is made whether starting conditions are met. If it is determined that starting conditions are not met, then, at block 1827, indication is provided of the status and actions required. One case of starting conditions not being met occurs if package 3601 is empty. In such a case, controller 3911 may cause display 105 to indicate to the consumer that the package is empty and a new package should be inserted.

If it is determined, at block 1825, that starting conditions are met, then, at block 1830, the determined cycle is executed. Initially, this is the cycle determined at block 1820. Nonetheless, process 1800 may yield a revised cycle at block 1875. In the embodiment illustrated in FIGS. 38 and 39, the determined cycle may include a combination of engagement of latch 3806, energizing of lower coil 3918 and/or upper coil 3917, rotation of cradle 3803, and ongoing temperature readings from infrared thermometer 3813 and thermometer 3922. The cycle may additionally, or alternatively, include re-scanning of barcode 3825 by barcode reader 3815 and/or the measurement of weight by scale 3910, to determine if package 3601 has been moved within or removed from heating apparatus 3800.

At block 1835, various sensor inputs are checked. At block 1840, a determination is made whether ending conditions are met. If ending conditions are met, then process 1800 moves to block 1850, wherein the cycle is completed. If ending conditions are not met at block 1840, then process 1800 proceeds to block 1845, wherein it is determined if determined cycle is proceeding as expected. If the cycle is proceeding normally, then, at block 1865, indications are provided, such status, and process 1800 returns to block 1835. Thus as long as ending conditions are not met and the process is proceeding normally, the process 1800 repeats a sub-cycle of blocks 1830, 1835, 1840, 1845 and 1865.

Figure 40:
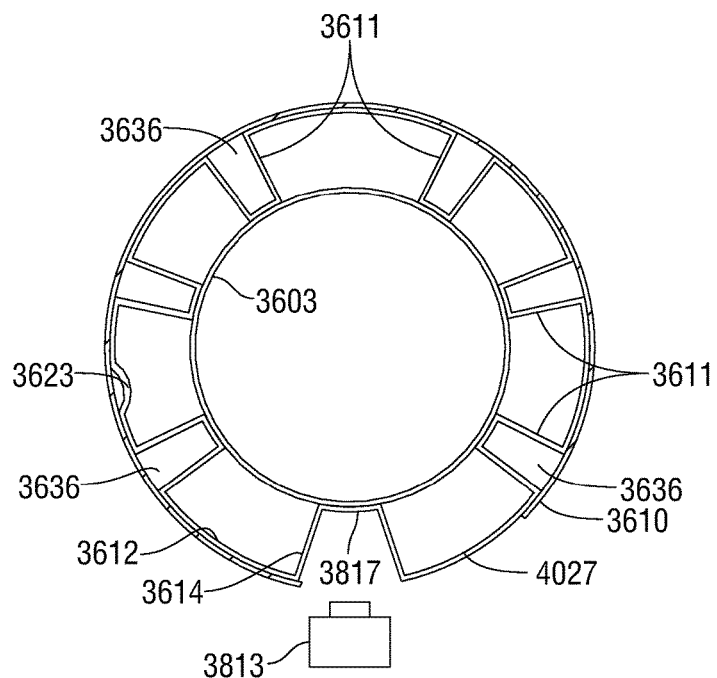
FIG. 40 is a cross-sectional view of a package in accordance with an embodiment of the present disclosure.

To illustrate the 1830-1835-1840-1865 sub-cycle, for example using the embodiments illustrated in FIGS. 38 to 40, in a cycle that proceeds normally. In this illustrative scenario, the temperature reading taken at uninsulated section 4027 may follow the pattern illustrated in FIG. 46. The cycle determined at block 1820 proscribes an ending condition wherein the temperature measured at uninsulated section 4027 is 145 degrees F. or higher. As the cycle is initially executed (i.e., at 0 seconds), at block 1835, infrared thermometer 3813 registers a temperature reading of 70 degrees F. at uninsulated section 4027. Since the ending condition of 145 degrees F. is not met, flowchart 1800 proceeds through block 1840 to block 1845. As shown in FIG. 46, the registered reading of 70 degrees F. lies between the minimum temperature of 68 degrees F. and the maximum temperature of 75, so process 1800 is proceeding as expected and moves to block 1865 to indicate the status of the process (e.g., display 105 may show that 0 seconds have elapsed and the current temperature is 70 degrees F.). After indicating status, process 1800 moves back to block 1830 to continue to execute the cycle. In this example, during each of iteration of the 1830-1835-1840-1865 subcycle, the process continues to proceed normally, with temperature increasing over time within the bounds of the minimum and maximum temperatures at any given time (i.e., consistent with FIG. 46), and no other sensor readings registering an unexpected situation. In one non-limiting example, at 60 seconds into the cycle the actual measured temperature at uninsulated section 4027 meets the proscribed ending condition of 145 degrees F.

At block 1840, a determination is made whether ending conditions are met. If it is determined that ending conditions are met, then, at block 1850, the process is completed and any final steps of the cycle are undertaken. In the example of FIGS. 38 and 39, at block 1850 controller 3911 causes coil(s) 3917 and/or 3918 to be deactivated and latch 3806 to be retracted. In some embodiments, controller 3911 may signal a completion message on display 105, indicating the end of the cycle to the consumer.

At block 1845, a determination is made whether the cycle is proceeding as expected (i.e., normally). If it is determined that the cycle is not proceeding normally, then, at block 1860, process 1800 identifies a scenario that is consistent with the fact pattern evident in the history of the cycle. For example, the scenario may be a "below minimum" scenario associated with temperature readings indicated in FIG. 48. In this illustrative scenario, after 10 second of cycle execution, infrared thermometer 3813 detects a temperature of 75 degrees F. at uninsulated section 4027. This temperature is below the minimum temperature boundary of 80 degrees F., so the process is not proceeding as expected and the process moves to block 1860. At block 1860, various factors are considered that may indicate a particular scenario. For example, infrared thermometer 3813 may register an unusually high temperature measurement at contact area 3817, which may indicate the lack of fluid adjacent to area 3817. Scale 3910 may additionally, or alternatively, register a weight for package 3601 that is much less than the weight measurement taken at block 1815, indicating an error in weight measurement. In this example, controller 3911 may associate this particular combination of sensor readings (i.e., under-temperature at uninsulated section 4027, over-temperature at contact area 3817, and inconsistent weigh readings) with a scenario that involves an empty package 3601.

At block 1870, a determination is made whether the scenario identified at block 1860 may be corrected through a revised cycle or not. If a revised cycle is not possible, then, at block 1870, an abnormal ending occurs. In the event of an abnormal ending, at block 1880, actions are taken that are appropriate for the scenario determined at block 1860. In the example described above, the heating apparatus embodiments illustrated in FIGS. 38 to 40 identify a scenario which involves an empty package. In this example, an abnormal ending may involve deactivating the coils, signaling to the consumer the situation and actions to be taken, and disengaging latch 3806 at an appropriate time (e.g., after the temperature of package 3601 assumes a safe temperature). In an illustrative example, controller 3911 obtains temperature readings from infrared thermometer 3813 during block 1880 in order to establish the safe conditions for disengaging latch 3806.

At block 1860, a scenario may be identified under which a revised cycle is possible. For example, an "above maximum" scenario may be identified associated with temperature readings indicated in FIG. 47. In an illustrative scenario, after 15 seconds of cycle execution, infrared thermometer 3813 detects a temperature of 100 degrees F. at uninsulated section 4027. This temperature is above the maximum temperature boundary of 97 degrees F., so the process is not proceeding as expected, and the process moves to block 1860. At block 1860, various factors are considered that may indicate a particular scenario. For example, infrared thermometer 3813 may register a normal temperature measurement at contact area 3817, which may indicate that fluid is present adjacent to area 3817. Scale 3910 may additionally, or alternatively, register a weight for package 3601 that is modestly below the weight measurement taken at block 1815, indicating a relatively minor error in weight measurement. In this example, controller 3911 may associate this particular combination of sensor readings (i.e., over-temperature at uninsulated section 4027, normal temperature at contact area 3817, and moderate weigh readings) with the presence of a partially (e.g., 75%) filled package 3601. In this case, a revised cycle is possible, and block 1870 would move to block 1875.

At block 1875, a revised cycle is determined based on the scenario identified at block 1860. In the example described above, the heating apparatus embodiments illustrated in FIGS. 38 to 40 identify a scenario which involves a 75% full package. In this scenario, the revised cycle might involve using only lower coil 3918 in the heating process and a lower current applied to the coil than would be applied to a full container. Once a revised cycle is determined, process 1800 moves from block 1875 back to block 1830. Process 1800 then proceeds as described previously from block 1830, resulting in either completed cycle 1850 or abnormal ending 1880.

Heating systems in the prior art may include deficiencies such as infrequent temperature measurement to determine if an appropriate end temperature has been achieved after a proscribed heating cycle, measure temperature at a single location on the container, rely solely on temperature measurement to determine if a heating cycle is complete and satisfactory, use a single end-point temperature to determine if a heating cycle should be ended, provides a control system that accommodates only full containers, and contain no means to mitigate the potential safety consequences to a consumer if a control cycle failed to proceed as plans.

A variety of alternate control systems may be used. Some of these may exclude certain elements shown in the presently-disclosed embodiments (e.g., communication with the manufacturer). The control system may feature additional elements including, for example: consumer-defined finished temperature for the heated consumable product; consumer-determined heating cycles (e.g., "rapid heat" or "slow warm"); a consumer-programmable time so that the appliance would complete a heating at the specified time; display of product information (e.g., contents and nutritional information) to the consumer; and communication with a computer, smart phone or other extant device possessed by the consumer or manufacturer.

FIG. 50 shows a heating apparatus and a package in accordance with an embodiment of the present disclosure. Heating apparatus 5000 and package 501 shown in FIG. 50 are similar to heating apparatus 100 and package 1 of FIG. 6, except for the first and second inductively heatable elements 503a, 503b and the configuration of ridges 506a, 506b formed in the side wall of container 502 configured to engage with recesses 542a, 542b formed in the first and second inductively heatable elements 503a, 503b, respectively.

Container 502, beverage 505, foot 507, pushup 508, housing 5012, cavity 5003, power source 5006, scale 5008, temperature probe 5010, electrical sensor 5111 and protrusion 5013 of FIG. 50, are similar to container 2, beverage 5, foot 7, pushup 8, housing 112, cavity 103, power source 106, scale 108, temperature probe 110, electrical sensor 111 and protrusion 113 of FIG. 6, respectively. Similarly, transmission lines 5014, 5017 and 5018 shown in FIG. 50 are similar to transmission lines 114, 117 and 118 of FIG. 6, respectively. Further description of the like elements is omitted in the interest of brevity.

Heating apparatus 5000 includes a first inductively heatable element 503a (also referred to as "lower inductively heatable element 503a"), which is axially aligned with lower coil 5001a, and a second heatable element 503b (also referred to as "upper inductively heatable element 503b"), which is axially aligned with upper coil 5001b. Lower inductively heatable element 503a is held in place within container 502 by ridge 506a formed in the side wall of container 502. Similarly, upper inductively heatable element 503b is held in place within container 502 by ridge 506b formed in the side wall of container 502. Upper temperature probe 5009b measures the temperature of container 502 at a point along the sidewall of container 502 which is above upper inductively heatable element 503b. Middle temperature probe 5009a measures the temperature of container 502 at point between lower inductively heatable element 503a and upper inductively heatable element 503b. Upper temperature probe 5009b and middle temperature probe 5009b, are communicatively coupled with controller 5007, by transmission lines 5015 and 5016, respectively. The temperatures measured by upper temperature probe 5009b, middle temperature probe 5009a and lower temperature probe 5010 each create data points, which controller 5007 may be configured to utilize to effect the control cycle of heating apparatus 5000.

In some embodiments, the first and second inductively heatable elements may heat beverage 505 at different rates at different locations within container 502. In one non-limiting example, beverage 505 may be a soup, such as chicken noodle soup, with particulates that settle to the bottom of container 502. In one embodiment, lower heatable element 503a may be made of a first material having a first thickness, e.g., configured to provide a relatively low heating rate, and upper heating element 503b may be made of a second material having a second thickness, e.g., configured to provide a relatively high heating rate. In this non-limiting example, when coils 5001a and 5001b are activated, the particulate matter at the bottom of container 502, adjacent to lower heating element 503a, may be heated at a slower rate so as not to scald the particulates, while the fluid present adjacent to upper heatable element 503b is heated rapidly to effectuate a rapid heating of the soup as a whole.

In other embodiments, lower heatable element 503a may be configured to provide a relatively high heating rate when compared to upper heatable element 503b. This configuration may be useful for mitigating the temperature gradient produced when rapidly heating beverage 505. In alternative embodiments, controller 5007 may be configured to cause the electrical current flowing to upper coil 5001b to be different from the electrical current flowing to lower coil 5001a. Thus controller 5007 may provide may provide a greater level of control of the relative heating rates of upper heatable element 503b and lower heatable element 503a at various points in time over a given heating cycle.

It is to be understood that features of the presently-disclosed heating apparatus embodiments may be combined in a variety of configurations. It is to be understood that the presently-disclosed heating apparatus embodiments may include additional, fewer, or different components than shown in the drawings. It is to be understood that features of the presently-disclosed package embodiments may be combined in a variety of configurations.

Although embodiments have been described in detail with reference to the accompanying drawings for the purpose of illustration and description, it is to be understood that the disclosed processes and apparatus are not to be construed as limited thereby. It will be apparent to those of ordinary skill in the art that various modifications to the foregoing embodiments may be made without departing from the scope of the disclosure.

What is claimed is:

1. A system for heating a consumable product, the system comprising:
   a package, including:
      indicia; and
      a container body including a cavity at least partially bounded by a side wall, the cavity configured to contain the consumable product; and
   a heating apparatus, including:
      a housing defining a package-receiving cavity configured to position the package in an operative position;
      a controller; and
      a camera which transmits images to the controller;
      wherein the controller is configured to recognize indicia on the package in the images and determine a fluid level within the container from the images.

2. The system of claim 1, wherein the indicia is located on a closure of the package.

3. The system of claim 2, wherein the indicia comprises one or more lines.

4. The system of claim 2, wherein the controller determines, using the images, whether the closure is on the package.

5. The system of claim 1, wherein the controller determines, based on the images, the position of the closure on the package.

6. The system of claim 1, wherein the controller determines the rotational position of the container within the cavity from one or more of the images.

7. The system of claim 1, wherein the controller determines the vertical position of the container within the cavity from one or more of the images.

8. The system of claim 1, further comprising at least one inductively heatable element spaced apart from the side wall.

9. The system of claim 8, wherein the indicia is located on the closure of the package.

10. The system of claim 9, wherein the indicia comprises one or more lines.

11. The system of claim 8, wherein the controller determines, based on the indicia, whether the closure has been removed from the package.

12. The system of claim 8, wherein the controller determines, based on the indicia, a position of the closure on the package.

13. The system of claim 8, wherein the controller determines the rotational position of the container within the cavity from one or more of the images.

14. The system of claim 8, wherein the controller determines the vertical position of the container within the cavity from one or more of the images.

15. The system of claim 8, wherein the controller is configured to determine a fluid level within the container from the images.

16. A system for heating a consumable product, the system comprising:
- a package, including:
  - a container body including a cavity for storing the consumable product; and
- a heating apparatus, including:
  - a housing defining a package-receiving cavity configured to position the package in an operative position;
  - a controller; and
  - an optical scanning device operative to transmit a signal to the controller;
  - wherein the controller is configured to determine a fluid level within the container based on the signal received from the optical scanning device.

17. A system for heating a consumable product, the system comprising:
- a package, including:
  - a container body including a cavity for storing the consumable product; and
  - a cap engageable with the container body; and
- a heating apparatus, including:
  - a housing defining a package-receiving cavity configured to position the package in an operative position;
  - a heating element;
  - a controller in operative communication with the heating element; and
  - an optical scanning device operative to transmit a signal to the controller;
  - wherein the controller is configured to recognize a position of the cap relative to the container body based on the signal received from the optical scanning device and control operation of the heating element based on the recognized position of the cap relative to the container body.

18. The system recited in claim 17, wherein the optical scanning device is capable of detecting a rotational position of the cap relative to the container body.

19. The system recited in claim 17, wherein the optical scanning device is capable of detecting a vertical position of the cap relative to the container body.

20. The system recited in claim 17, wherein the cap includes indicia thereon for recognizing the position of the cap relative to the container body.

\* \* \* \* \*